(12) United States Patent
Takahashi

(10) Patent No.: US 7,564,190 B2
(45) Date of Patent: Jul. 21, 2009

(54) LIGHT SOURCE DEVICE AND IMAGE DISPLAYING APPARATUS USING THE SAME

(75) Inventor: Ryusaku Takahashi, Kanagawa-ken (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 69 days.

(21) Appl. No.: 11/808,417

(22) Filed: Jun. 8, 2007

(65) Prior Publication Data
US 2007/0285192 A1 Dec. 13, 2007

(30) Foreign Application Priority Data
Jun. 9, 2006 (JP) ............... 2006-161481
Jun. 9, 2006 (JP) ............... 2006-161486

(51) Int. Cl.
*H01J 65/04* (2006.01)
(52) U.S. Cl. ............... 315/39; 315/111.01; 315/111.21; 333/202; 333/248; 313/231.01; 313/634
(58) Field of Classification Search ............. 315/73–76, 315/111.21, 111.41, 39, 39.53, 111.01, 111.71; 333/202, 206, 208, 222, 227, 243, 248, 99 PL; 313/231.01, 231.31, 231.41, 231.61, 231.71, 313/484, 634–637
See application file for complete search history.

(56) References Cited

U.S. PATENT DOCUMENTS

| | | | | | |
|---|---|---|---|---|---|
| 5,039,918 | A | * | 8/1991 | Ohtake et al. | 315/248 |
| 5,420,390 | A | * | 5/1995 | Abe | 219/121.36 |
| 5,998,934 | A | * | 12/1999 | Mimasu et al. | 315/118 |
| 6,049,170 | A | * | 4/2000 | Hochi et al. | 315/39 |
| 6,737,809 | B2 | | 5/2004 | Espiau et al. | |
| 6,922,021 | B2 | * | 7/2005 | Espiau et al. | 315/248 |

* cited by examiner

*Primary Examiner*—Douglas W Owens
*Assistant Examiner*—Jimmy T Vu
(74) *Attorney, Agent, or Firm*—Clark & Brody

(57) ABSTRACT

A light source device comprises a waveguide, an electrodeless lamp, a probe, and conversing means. The waveguide is formed to contain a medium enabling a microwave to resonate and has a surface and an aperture cavity with an aperture opened at a predetermined position of the surface. The electrodeless lamp is loaded in the aperture cavity in a state where part of the electrodeless lamp is protruded from the surface of the waveguide so that the part of the electrode lamp emits light in response to applying the microwave to the electrodeless lamp. The probe supplies a high-frequency signal to the waveguide so that the high-frequency signal is converted to the microwave in the waveguide. The converging means is disposed on the surface of the waveguide to face the aperture cavity and utilizes all the light emitted from the part of the electrodeless lamp to converge the light.

9 Claims, 20 Drawing Sheets

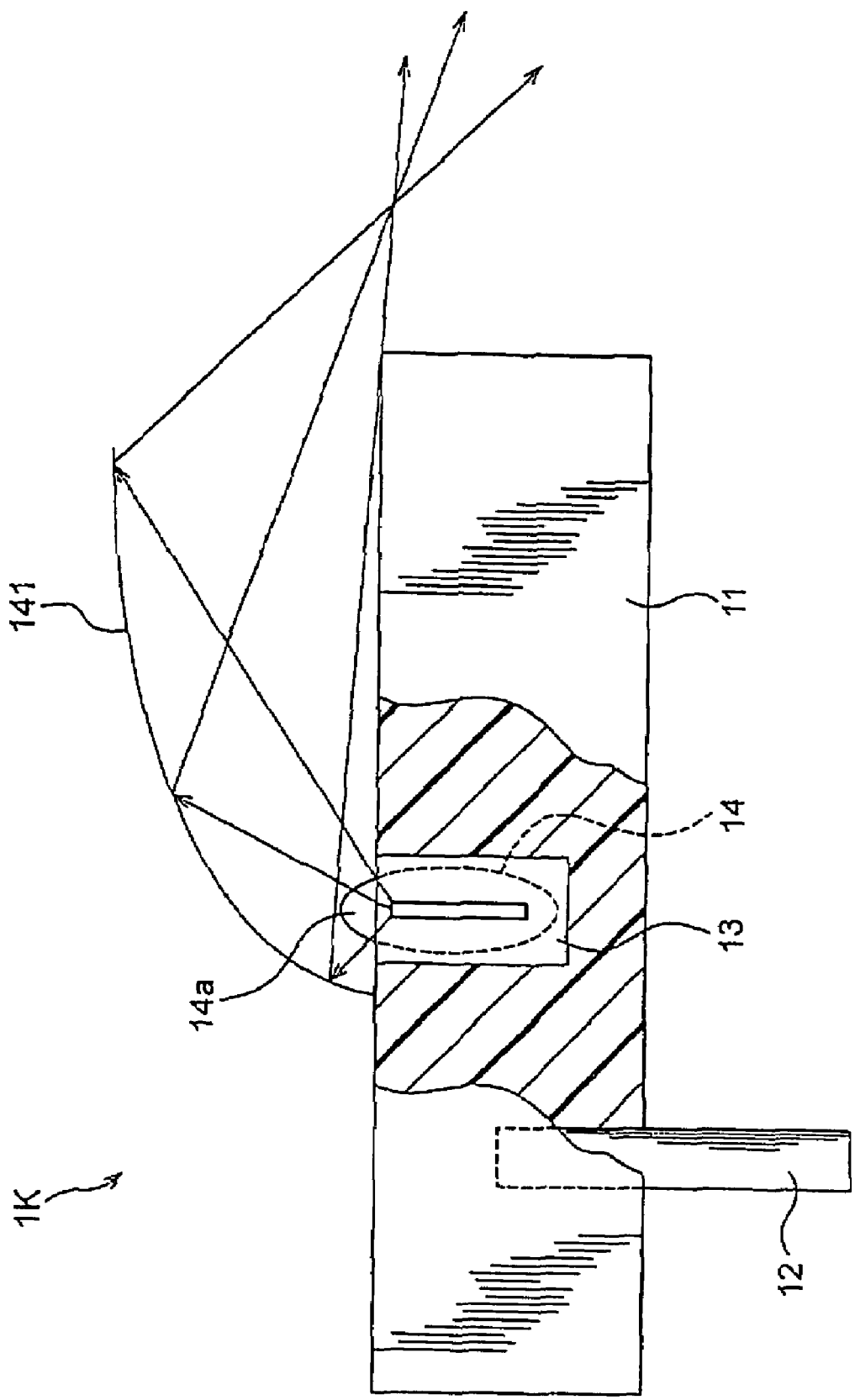

LIGHT SOURCE DEVICE AND IMAGE DISPLAYING APPARATUS USING THE SAME

CROSS REFERENCE TO RELATED APPLICATION

Japanese Patent applications No. 2006-161481 filed on Jun. 9, 2006 and No. 2006-161486 filed on Jun. 9, 2006.

BACKGROUND OF THE INVENTION

1. Field of the Invention

The present invention relates to a light source device and an image displaying apparatus, and in particular, to a light source device comprising a waveguide and an electrodeless lamp loaded in an aperture cavity formed in the waveguide such that the electrodeless lamp emits light in response to microwaves generated in the waveguide, and to an image displaying apparatus that employs such a light source device.

2. Description of the Related Art

A light source device has been known which comprises a waveguide and an electrodeless lamp, in which the electrodeless lamp is arranged in the waveguide to emit light. Such light source devices are disclosed by U.S. Pat. No. 6,737,809, for example.

Specifically, the above patent discloses a light source device that comprises a waveguide, a probe, and an electrodeless lamp. The waveguide has a cylindrical outer shape provided by a dielectric member and coated with a metal material. An aperture cavity with a bottom is formed in the waveguide so as to be located at the center in one end surface of the waveguide. The electrodeless lamp, which emits light in response to microwaves to be supplied, is made into a thin shape and loaded into the aperture cavity such that one end thereof faces the bottom and the other end thereof protrudes from the surface of the waveguide. The probe is linked with the other end of the waveguide at a position shifted outwardly from the center in the radial direction. This probe receives high-frequency power from a high-frequency power supply.

When the high-frequency power is supplied to the prove 12, the waveguide generates microwaves therein and is resonated with the use of the dielectric maternal as medium. The electric field caused by the microwaves becomes maximum at the radial center of the waveguide, that is, at the position of the aperture cavity. Plasma is generated in the wireless lamp due to the microwaves generated in the aperture cavity, whereby light is emitted from the end of the electrodeless lamp, the end of which is protruded from the surface of the waveguide.

The electrodeless lamp has an inner wall providing a diffuse reflection surface (Irregular reflection surface). Thus the emitted light has a distribution which is similar to one obtained from the perfect diffuse surface, i.e., Lambertian diffuse surface.

When such a light source device is applied, for example, to a projector, it is required that a light condensing system with various optical components such as an collimating lens or a convex lens system (such as condensing lenses) be arranged with the light source device. The light condensing system condenses the light emitted from the light source device.

However, in the conventional light source device described above, the flux of light emitted from the electrodeless lamp has a projection angle which is considerably wide. Hence even if the light condensing system employs the convex lens system, a light condensing efficiency is low and unsatisfactory, because a flux of light passing a comparatively narrow angular range next to the light axis is utilized as light traveling toward the light condensing system, but a flux of light outside the range is not utilized.

In addition, the above wider projection angle also brings about another difficulty that a light condensing system employed by a projector becomes large in its size.

SUMMARY OF THE INVENTION

The present invention has been made in consideration of the foregoing difficulties, and an object of the present invention is to provide a light source device of which light condensing efficiency is made higher by reducing the "etendue" of the light source device.

A further object of the present invention is to provide an image displaying apparatus which is compact in size and light in weight by employing a light source device allowing a light condensing system arranged with the device to be compact.

In order to realize the object about the light source device, as one aspect, the present invention provides a light source device comprises a waveguide, electrodeless lamp, probe, and converging means. The waveguide is formed to contain a medium enabling a is microwave to resonate and formed to have a surface and an aperture cavity with an aperture opened at a predetermined position of the surface. The electrodeless lamp is loaded in the aperture cavity in a state where part of the electrodeless lamp is protruded from the surface of the waveguide so that the part of the electrode lamp emits light in response to applying the microwave to the electrodeless lamp. The probe supplies a high-frequency signal to the waveguide so that the high-frequency signal is converted to the microwave in the waveguide. The converging means is disposed on the surface of the waveguide to face the aperture cavity and formed to utilize all the light emitted from the part of the electrodeless lamp so as to converge the light.

By way of example, the converging means comprises a spherical reflecting mirror formed into a quaquaversal shape having a top, disposed on the surface of the waveguide to enclose the aperture cavity, and formed to have a semi-spherical reflecting surface to be opposed to the aperture cavity and an aperture formed at the top of the mirror, the reflecting surface providing a focus located at the part of the electrodeless lamp and the aperture of the mirror allowing the light emitted from the part of the electrodeless lamp to pass therethrough.

Furthermore, in order to realize the object concerning the image displaying apparatus, the present invention provides an image displaying apparatus comprising a light source device. This light source device comprises a waveguide formed to contain a medium enabling a microwave to resonate and formed to have a surface and an aperture cavity with an aperture opened at a predetermined position of the surface; an electrodeless lamp loaded in the aperture cavity in a state where part of the electrodeless lamp is protruded from the surface of the waveguide so that the part of the electrode lamp emits light in response to applying the microwave to the electrodeless lamp; a probe supplying a high-frequency signal to the waveguide so that the high-frequency signal is converted to the microwave in the waveguide; and converging means disposed on the surface of the waveguide to face the aperture cavity and formed to utilize all the light emitted from the part of the electrodeless lamp so as to converge the light. The image displaying apparatus further comprises a separator separating the light emitted from the light source device into fluxes of light of three primary colors consisting of red, green and blue; a modulator modulating each of the separated fluxes of light of the three primary colors depending on image signals; and a dichroic prism optically combining the modulated fluxes of light to emit the combined fluxes of light as image light.

BRIEF DESCRIPTIONS OF THE DRAWINGS

In the accompanying drawings:

FIG. 17 is a side view, which is partly sectioned, showing the configuration of a light source device according to a fourteenth embodiment of the present invention.

DETAILED DESCRIPTION OF PREFERRED EMBODIMENTS

Referring to accompanying drawings, various embodiments of a light source device and an image displaying apparatus according to the present invention will now be described.

First Embodiment

Figure 1:
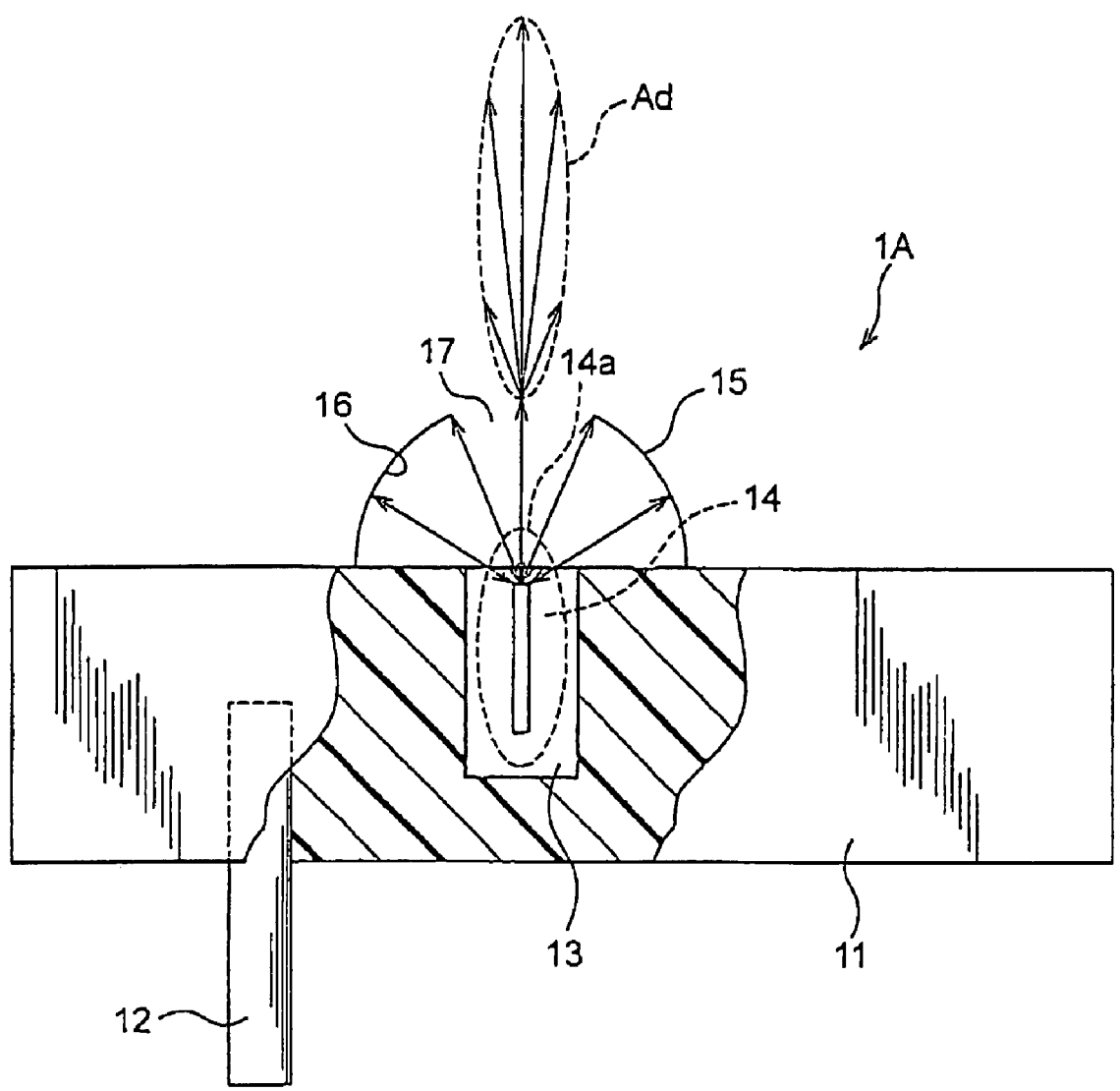
FIG. 1 is a side view, which is partly sectioned and accompanied by a light distribution, showing the configuration of a light source device according to a first embodiment of the present invention.

Referring to FIG. 1, a first embodiment of the light source device according to the present invention will now be described.

As shown in FIG. 1, a light source device 1A of the present embodiment is provided with a waveguide 11, a probe 12, an electrodeless lamp 14, and a spherical reflecting mirror 15. Of these, the waveguide 11 is a cylindrical member made of a dielectric material with an outer surface coated with a metal material. The waveguide 11 has a central axis along an axial direction and both circular end surfaces in the axial direction. At a part of one of both axial end surfaces, which part is located at the center or near the center thereof, an aperture cavity 13 is formed to open outside.

The electrodeless lamp 14 is a lamp emitting light in response to applying microwaves thereto and is formed to have a thin and long shape having a longitudinal direction. This electrodeless lamp 14 is loaded in the aperture cavity 13 such that one end of this electrodeless lamp 14 in the longitudinal direction is placed in the electrodeless lamp 14 and the other end 14a is partly protruded from the circular end surface of the waveguide 11. The other end 14a serving as a light emitting part.

The probe 12 has both ends, one of which is electrically connected with a not-shown high-frequency power supply and the other end of which is linked to the other end surface of the waveguide at a position radially shifted from the center of this end surface. The spherical reflecting mirror 15 is formed into a dome-like member with an inner reflecting surface 16 formed to have an approximately semi-spherical shape. Thus the reflecting surface 16 has a radially central top portion in which an aperture 17 is formed, and the mirror 16 is formed to have a focus located at the light emitting part 14a of the electrodeless lamp 14, which light emitting part 14a is protruded from the end surface of the wave guide 11. With this geometry maintained, the spherical reflecting mirror 15 is mounted to the end surface of the waveguide 11.

When high-frequency power is supplied to the waveguide 11 via the probe 12 from the not-shown high-frequency power supply, microwaves are generated in the waveguide 11 which is resonant with the dielectric material used as a medium. As this dielectric material, a ceramic material is used because of its higher relative permittivity. In addition, the probe 12 is positioned at a radial central position of the waveguide 11, which radial central position is in the aperture cavity 13 and subject to appearance of a maximum electric field generated in the waveguide 11. The microwaves generated in the aperture cavity 13 enables the generation of plasma at the electrodeless lamp 14, whereby light is emitted from the light-emitting part 14a protruded from the end surface of the waveguide 11.

A flux of light emitted from the light-emitting part 14a of the electrodeless lamp 14 is reflected by the semicircular spherical reflecting surface 16 of the mirror 15 such that the flux of light is returned to the light-emitting part 14a. The returned light is reflected by a diffused reflection surface of an inner wall of the electrodeless lamp 14 to overlap with the light emitted from the light-emitting part 14a. Thus the luminance of the lamp 14 is enhanced. This results in emission of a large amount of flux of light from the aperture 17 of the spherical reflecting mirror 15. Hence an emitted light distribution Ad becomes as shown in FIG. 1, in which the distribution is longer in its light axis direction. Compared to an emitted light distribution of the conventional apparatus, which distribution is nearly a Lambertian-diffuse surface, the emitted light distribution according to the present embodiment is improved largely.

In this way, the spherical reflecting mirror 15 is mounted to make it possible that a large amount of flux of light is radiated through the aperture 17 with a smaller solid angle. In comparison with the conventional, "etendue" can be made smaller, whereby the light source device with a higher coupling efficiency can be provided. In addition, by changing the bore of the aperture 17, an amount of reduction in etendue can be adjusted freely.

The term "etendue" will now be described. The "etendue" is an invariant indicating a spatial spread of a flux of light passing an optical system and a cross section through which the flux of light passes. The etendue can be expressed as a product of an area S and a solid angle θ. That is, a value ξ(sr·m²) of the etendue can be defined as follows:

$$\xi = n \cdot S \cdot \sin\theta \cdot \sin\theta \quad (1)$$

For example, for improving the etendue of a light source (i.e., a lamp) used for a projector, the etendue should be made smaller. Thus, in such a case, the etendue can be improved by making a light-emitting area smaller and/or making a light radiation angle smaller.

Second Embodiment

Figure 2:
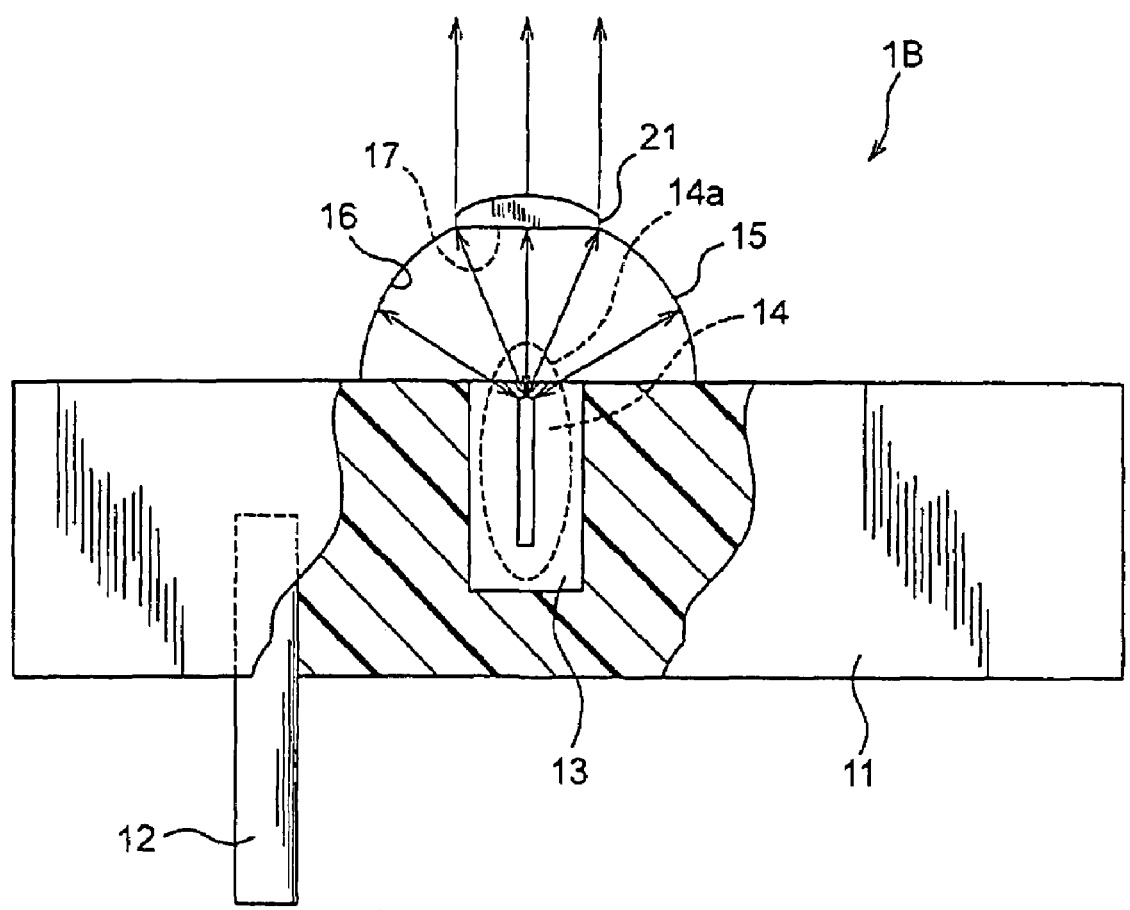
FIGS. 2-7 are side views, which are partly sectioned, showing the configuration of light source devices according to second to seventh embodiments of the present invention, respectively.

Referring to FIG. 2, a second embodiment of the present invention will now be described. In the present embodiment and subsequent embodiments, for the sake of removing redundancy of the description, components identical or similar to those described in the previous embodiments will be given the same reference numerals and the explanations therefore will be omitted or simplified.

In the present embodiment, the light source device is reduced Into practice in another form.

FIG. 2 shows the structure of a light source device 1B according to the present embodiment. As shown therein, the light source device 1B is additionally provided with a convex lens 21 mounted on the spherical reflecting mirror 15 to cover the aperture 17 thereof. The remaining components of this device 1B are identical to those in FIG. 1 explaining the first embodiment.

Accordingly, the flux of light radiated through the aperture 17 of the spherical reflecting mirror 15 is collimated into a collimated flux of light corresponding to the area of the aperture 17. The collimated flux of light is then radiated from the convex lens 21.

In the present embodiment, the light source device can be provided, which is smaller in the etendue than the conventional device and higher in the coupling efficiency, thus being suitable for use in optical systems such as smaller-diameter light pipes. Besides, the bore of the aperture 17 can be changed freely to adjust an amount of reduction in the etendue, as in the first embodiment.

Third Embodiment

Figure 3:
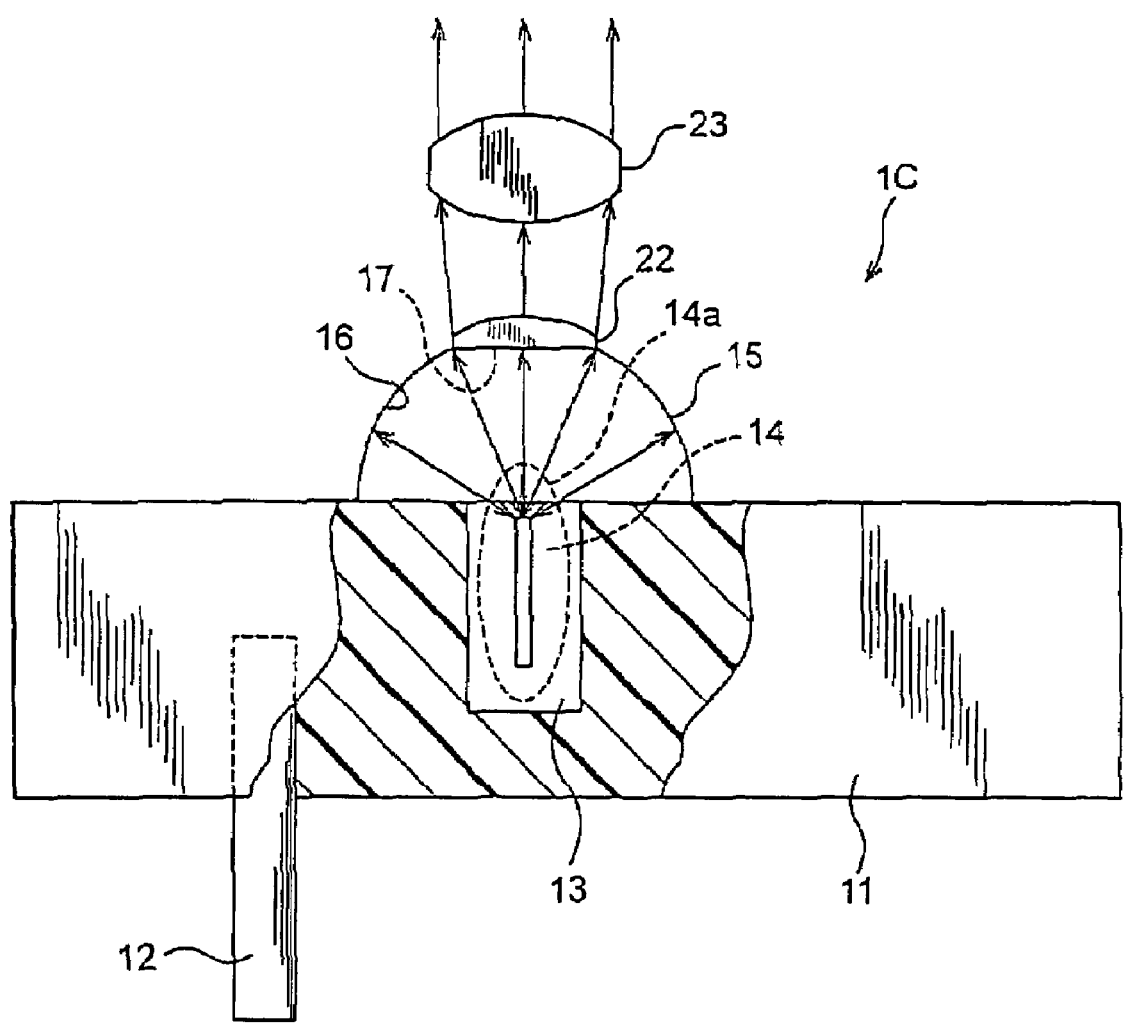

Referring to FIG. 3, a second embodiment of the present invention will now be described. In the present embodiment, the light source device is reduced into practice in another form.

FIG. 3 shows the structure of a light source device 1C according to the present embodiment. As shown therein, the light source device 1C is additionally provided with a lens system consisting of convex lenses 22 and 23. Of these, the convex lens 22 is mounted on the spherical reflecting mirror 15 to cover the aperture 17 thereof, while the convex lens 23 is fixedly located apart from the convex lens 22 by a predetermined distance in front of the convex lens 22. The remaining components of this device 1C are identical to those in FIG. 1 explaining the first embodiment.

Hence the flux of light radiated through the aperture 17 of the spherical reflecting mirror 15 is narrowed in its radiation angle by the first convex lens 22, and then collimated by the second convex lens 23. Accordingly, as illustrated in FIG. 3, the collimated flux of light, of which collimated sectional area is larger than the area of the aperture 17, is radiated.

In the present embodiment, the light source device can be provided which is smaller in the etendue than the conventional device and higher in the coupling efficiency, thus being suitable for use in optical systems such as medium-sized-diameter light pipes. Besides, the bore of the aperture 17 can be changed freely to adjust an amount of reduction in the etendue, as in the first embodiment.

Fourth Embodiment

Figure 4:
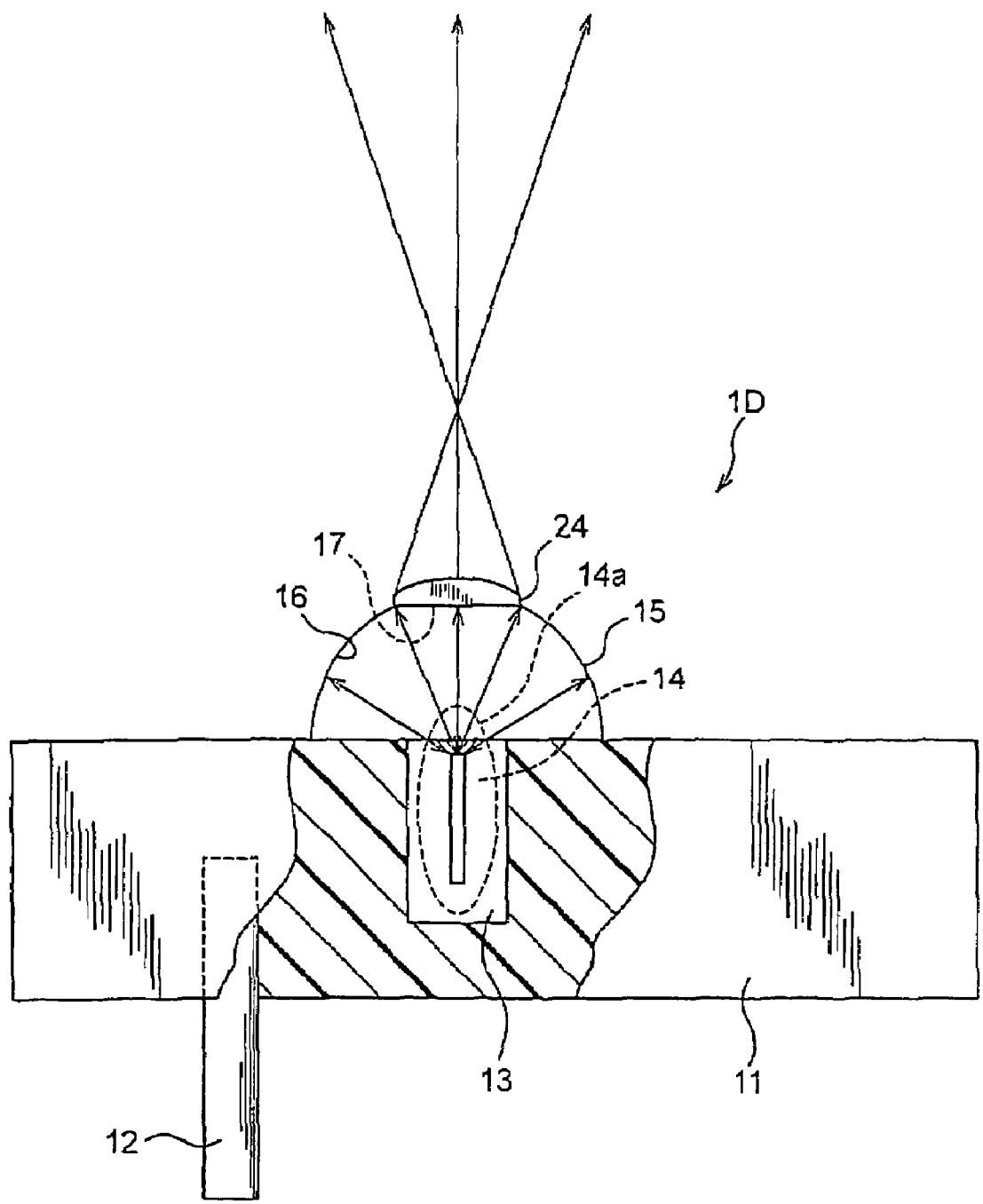

Referring to FIG. 4, a fourth embodiment of the present invention will now be described. In the present embodiment, the light source device is reduced into practice in another form.

FIG. 4 shows the structure of a light source device 1D according to the present embodiment. As shown therein, the light source device 1D is additionally provided with a convex lens 24 mounted on the spherical reflecting mirror 15 to cover the aperture 17 thereof. This convex lens 24 has a focal distance shorter than that of the convex lens 21 adopted in the structure shown in FIG. 2. The remaining components of this device 1D are identical to those in FIG. 1 explaining the first embodiment.

In this structure of the fourth embodiment, the flux of light radiated through the aperture of the spherical reflecting mirror 15 is converged to radiate the converged light.

It is therefore possible to provide the light source device gaining advantages identical or similar to those in the second embodiment.

Fifth Embodiment

Figure 5:
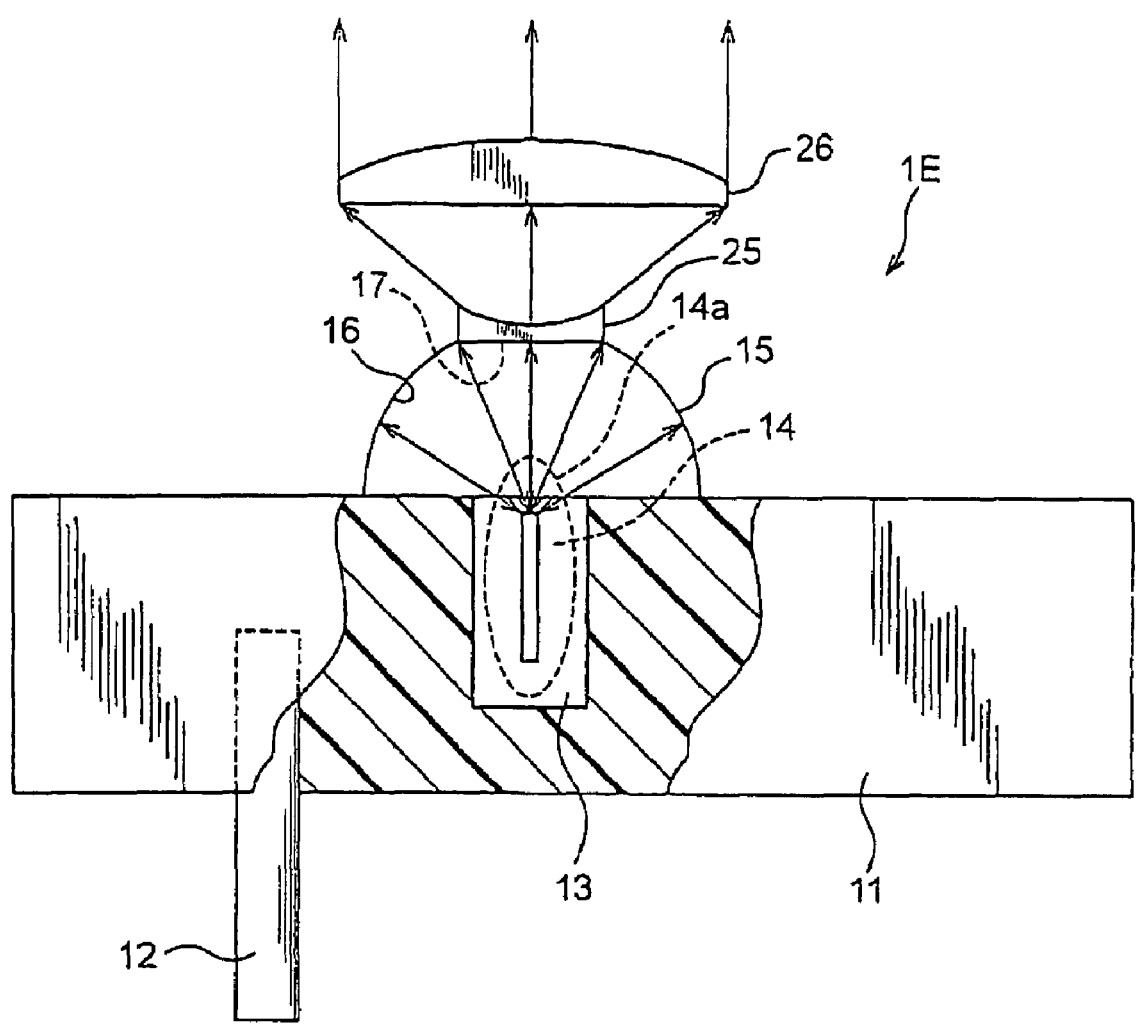

Referring to FIG. 5, a fifth embodiment of the present invention will now be described. In the present embodiment, the light source device is reduced into practice in another form.

FIG. 5 shows the structure of a light source device 1E according to the present embodiment. As shown therein, the light source device 1E is additionally provided with a lens system consisting of a concave lens 2S and a convex lens 26. Of these, the concave lens 25 is mounted on the spherical reflecting mirror 15 to cover the aperture 17 thereof, while the convex lens 26 is fixedly located apart from the concave lens 25 by a predetermined distance in front of the concave lens 25. The remaining components of this device 1E are identical to those in FIG. 1 explaining the first embodiment.

Hence the flux of light radiated through the aperture 17 of the spherical reflecting mirror 15 is widened in its radiation angle by the concave lens 25, and then collimated by the convex lens 26. Accordingly, as illustrated in FIG. 5, the collimated flux of light, of which collimated sectional area is greatly larger than the area of the aperture 17, is radiated.

It is therefore possible to provide the light source device with advantages similar to those gained in the third embodiment. Especially, it is preferred that this device is applied to optical systems such as larger-diameter light pipes.

Sixth Embodiment

Figure 6:
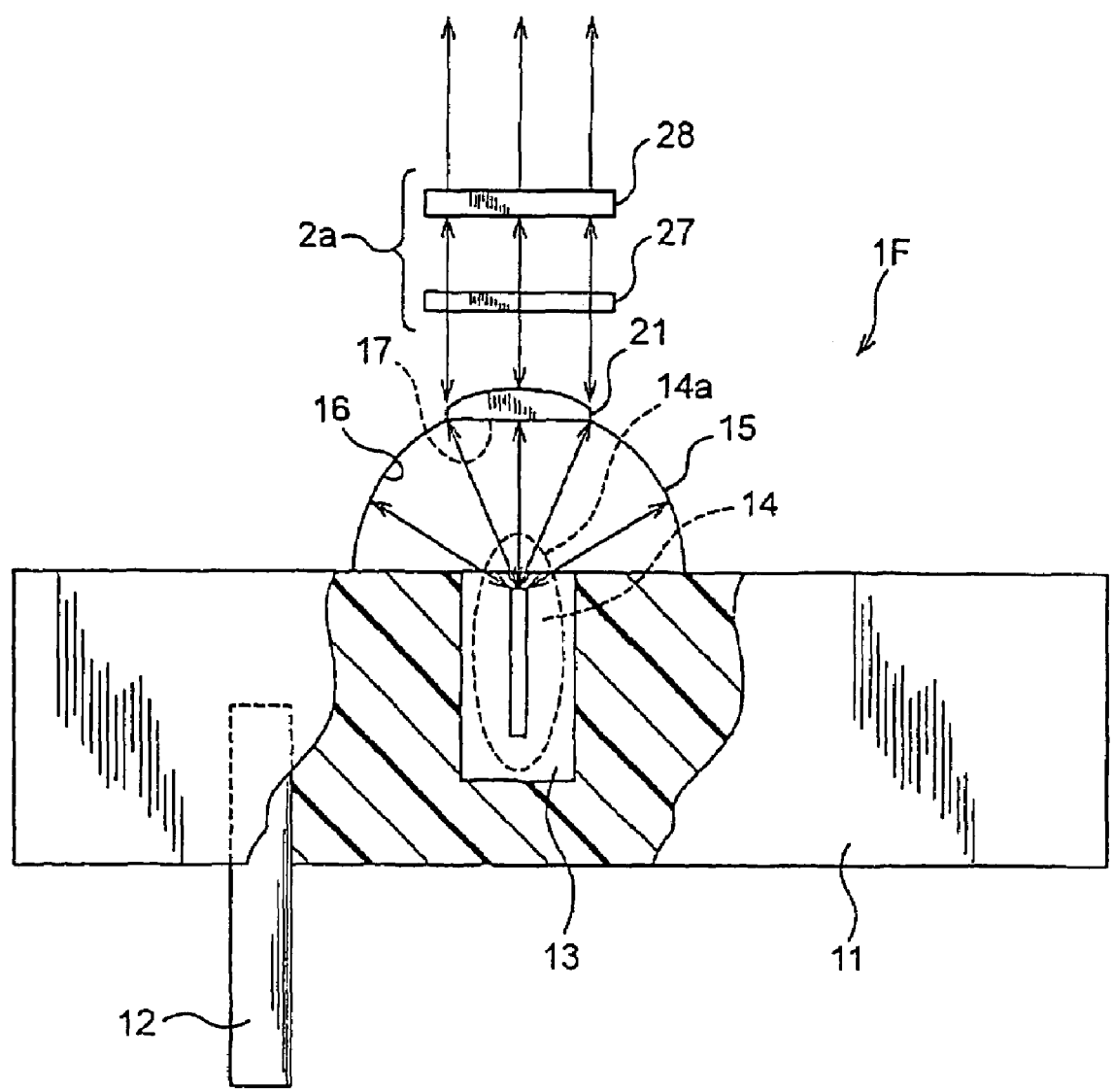

Referring to FIG. 6, a sixth embodiment of the present invention will now be described. In the present embodiment, the light source device is reduced into practice in another form.

FIG. 6 shows the structure of a light source device 1F according to the present embodiment. As shown therein, the light source device 1F is additionally provided with a convex lens 21 and a polarization/conversion unit 2a composed of a quarter wave plate 27 and a reflective polarization plate 28.

Of these additional components, the convex lens 21 is mounted on the spherical reflecting mirror 15 to cover the aperture 17 thereof. Meanwhile, the quarter wave plate 27 and the reflective polarization plate 28 are fixedly inserted in the optical path from the convex lens 21 in turns such that the components are positioned at intervals in front of the convex lens 21. The remaining components of this device 1E are identical to those in FIG. 1 explaining the first embodiment.

Thus the flux of light radiated through the aperture 17 of the spherical reflecting mirror 15 is once collimated by the convex lens 21, and the collimated flux of light passes the polarization/conversion unit 2a. In this situation, light of a polarized plane which is not allowed to pass the reflective polarization plate 28 is returned to the light emitting part 14a of the electrodeless lamp 14 via the quarter wave plate 27 and the convex lens 21, thus enabling the light emitting part 14a to use the returned light as emitted light again.

Even in a case where the quarter wave plate 27 is not provided, the light which is not allowed to pass the reflective polarization plate 28 can be returned to the light emitting part 14a.

Therefore, the light source device according to the present embodiment is able to gain advantages identical to those in the second embodiment. An additional advantage in the present embodiment is that, compared to the optical system shown in FIG. 2, where only the convex lens 21 is mounted to the aperture 17, the coupling efficiency can be enhanced more.

Seventh Embodiment

Figure 7:
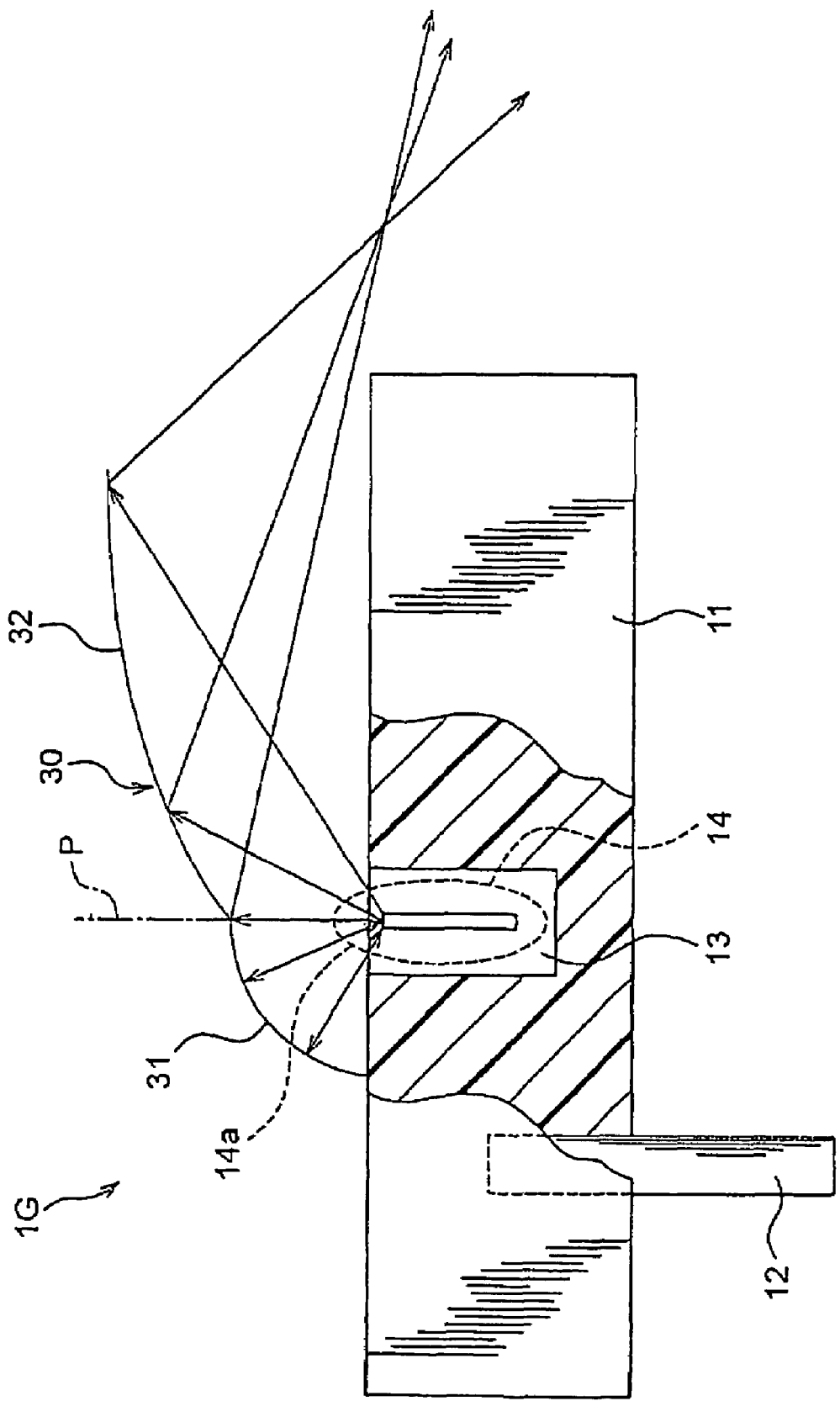

Referring to FIG. 7, a seventh embodiment of the present invention will now be described. In the present embodiment, the light source device is reduced into practice in another form.

FIG. 7 shows the structure of a light source device 1G according to the present embodiment. As shown therein, the light source device 1G is based on the structure of the light source device 1A shown in FIG. 1, but the spherical reflecting mirror 15 is replaced by a reflecting mirror 30. This reflecting mirror 30 is mounted on the surface of the waveguide 11 such that the mirror 30 contains the light emitting part 14a.

The reflecting mirror 30 is composed of a spherical reflecting mirror part 31 and an ellipsoidal reflecting mirror part 32, which are linked with each other but positionally divided by a plane P hypothetically set perpendicularly to the surface of the waveguide 11 at the position of the electrodeless lamp 14. This hypothetical plane P is able to divide the flux of light from the light emitting part 14a into approximately two fluxes in a hypothetical manner.

The spherical reflecting mirror part 31 is positioned to receive and reflect one flux of light hypothetically divided by the plane P, in which an amount of light reflected by this mirror part 31 is nearly half of the amount of light from the light emitting part 14a. In addition, this mirror part 31 is given a focal point positioned at the light emitting part 14a. Hence the flux of light reflected by this mirror part 31 is returned to the light emitting part 14a for re-emission therefrom.

In contrast, the ellipsoidal reflecting mirror part 32 is positioned to receive and reflect the other flux of light hypothetically divided by the plane P and laterally opened to the outside as shown in FIG. 7. An amount of light reflected by this mirror part 32 is nearly half of the amount of light from the light emitting part 14a. Thus the flux of light received by the mirror part 32 is reflected through the opening between the mirror part 32 and the waveguide 11, and then converges at a point outside the waveguide 11.

A modification is to replace the ellipsoidal reflecting mirror part 32 by a reflecting mirror provided with a paraboloidal reflecting mirror part. A paraboloid of this mirror part also reflects the light in the similar way as the ellipsoidal reflecting mirror part 32, so that the collimated light can also be obtained outside the waveguide 11.

The light source device according to the present embodiment is able to reduce the etendue down to approximately ¼ of the etendue of the conventional device. Hence the coupling efficiency can be made higher than the conventional. In addition, the light source device can preferably be applied to optical systems such as smaller-diameter light pipes.

Eighth Embodiment

Figure 8:
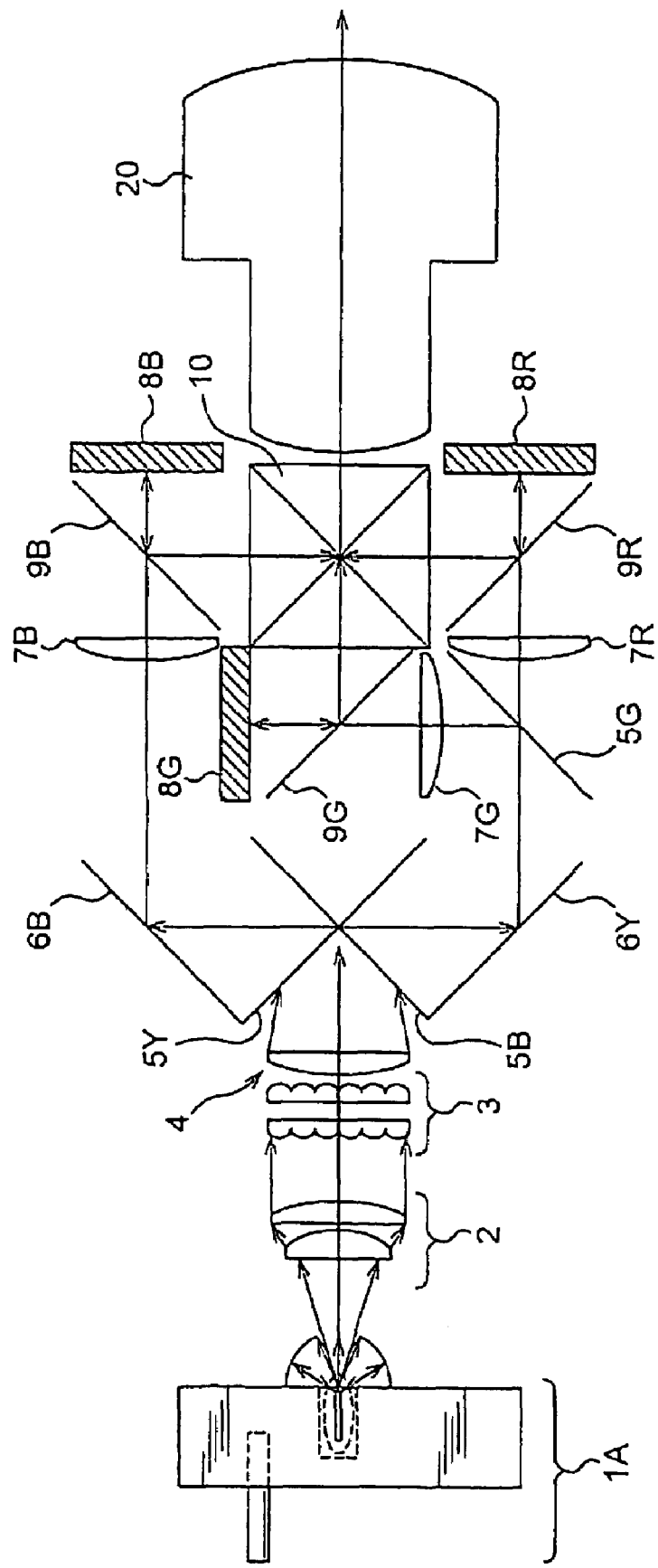
FIGS. 8-10 are outlined schematic diagrams showing image displaying apparatuses according to eight to tenth embodiments of the present invention, respectively.

Referring to FIG. 8, an eighth embodiment of the present invention will now be described. In the present embodiment, the light source device 1A according to the first embodiment is reduced into practice as a light source of an image displaying apparatus of the present invention.

FIG. 8 shows the configuration of a projector serving as the above image displaying apparatus. This projector is provided with, in addition to the light source device 1A shown in FIG. 1, a condensing device 2, an integrator 3, and a first field lens 4 placed in the course of a light output path from the light source device 1A in this order. On the output side of this lens system, dichroic mirrors 5B, 5Y and 5G and mirrors 6B and 6Y are placed as color separation means for separating the light into three primary colors of light. On the output side of these mirrors, spatial light modulation devices 8R, 8G and 8B each composed of a reflective liquid crystal display panel are placed for modulation of each flux of color light separated.

Second field lenses 7R, 7G and 7B are placed after the mirrors 6B and 6Y and dichroic mirror 5G. Between each of the second field lenses 7R, 7G and 7B and each of the spatial light modulation devices 8R, 8G and 8B, polarizing beam splitters 9R, 9G and 9B is placed, respectively. These polarizing beam splitters 9R, 9G and 9B are placed to guide, to a cross dichroic prism 10, each flux of color light modulated by each of the spatial light modulation devices 8R, 8G and 8B. The cross dichroic prism 10 is placed for synthesizing all the fluxes of color modulated light. In the output optical path from this prism 10, there is placed a projection lens 20.

The operations of this projector shown in FIG. 8 will now be detailed.

Light emitted from the light source device 1A is converted to a parallel flux of light by the condensing device 2. In order to gain an even Illuminating light, the integrator 3 receives the converted parallel flux of light and separates it into a plurality of segments of light, and makes an image formation relationship for illuminating display elements, segment by segment. The first field lens 4 corresponds in size to the aperture of the integrator 3 and makes the flux of light enter the dichroic mirrors 5B and 5Y in compliance with the apertures of the dichroic mirrors 5B and 5Y. The dichroic mirror 5Y reflects each of the fluxes of red and green light, while the dichroic mirror 5B reflects the flux of blue light. Each of the fluxes of red and green light reflected by the dichroic mirror 5Y is bent by the mirror 6Y and then makes Incidence onto the dichroic mirror 5G. This dichroic mirror 5G reflects the flux of green light and allows the flux of red light to pass therethrough.

The flux of green light, which reflected from the dichroic mirror 5G, makes incidence onto the spatial light modulation device 8G via the second field lens 7G and the polarizing beam splitter 9G. The flux of green light, which have entered this device 8G, is subjected to modulation on image signals, and the modulated light is reflected by the polarizing beam splitter 9G to enter the cross dichroic prism 10.

Further, the flux of red light, which have transmitted the dichroic mirror 5G, makes incidence onto the spatial light modulation device 8R via the second field lens 7R and the polarizing beam splitter 9R. The flux of red light, which have entered the modulation device 8R, is then subjected to modulation on image signals, and then the modulated light is reflected by the polarizing beam splitter 9R to make incidence onto the cross dichroic prism 10.

Moreover, the flux of blue light, which has been reflected by the dichroic mirror 5B, is bent by the mirror 6B to make incidence onto the spatial light modulation device 8B after passing the second field lens 7B and the polarizing beam splitter 9B in turns in this order. The flux of blue light, which have entered this modulation device 8B, is subjected to modulation on image signals, and the modulated light is reflected by the polarizing beam splitter 9R to make incidence onto the cross dichroic prism 10.

The fluxes of green, red and blue light modulated on the image signals respectively are synthesized with each other so that full-color image light enters the projection lens 20. The incident full-color image light is enlarged by the projection lens 20 and projected on a not-shown screen.

In the present eighth embodiment, the light source device 1A with a smaller etendue, which has been explained in the first embodiment, is used. Hence the optical system for condensing light can be made compact, so that the image displaying apparatus can be formed as a compact and less-weight one. Additionally, the reflective liquid crystal display panel is used as each of the spatial light modulation devices 8R, 8G and 8B, it is possible to provide an appropriate illuminating system to the smaller-etendue optical system on the polarizing conversion. This provides the image displaying apparatus with higher luminance, higher contrast, and longer operation life.

Ninth Embodiment

Figure 9:
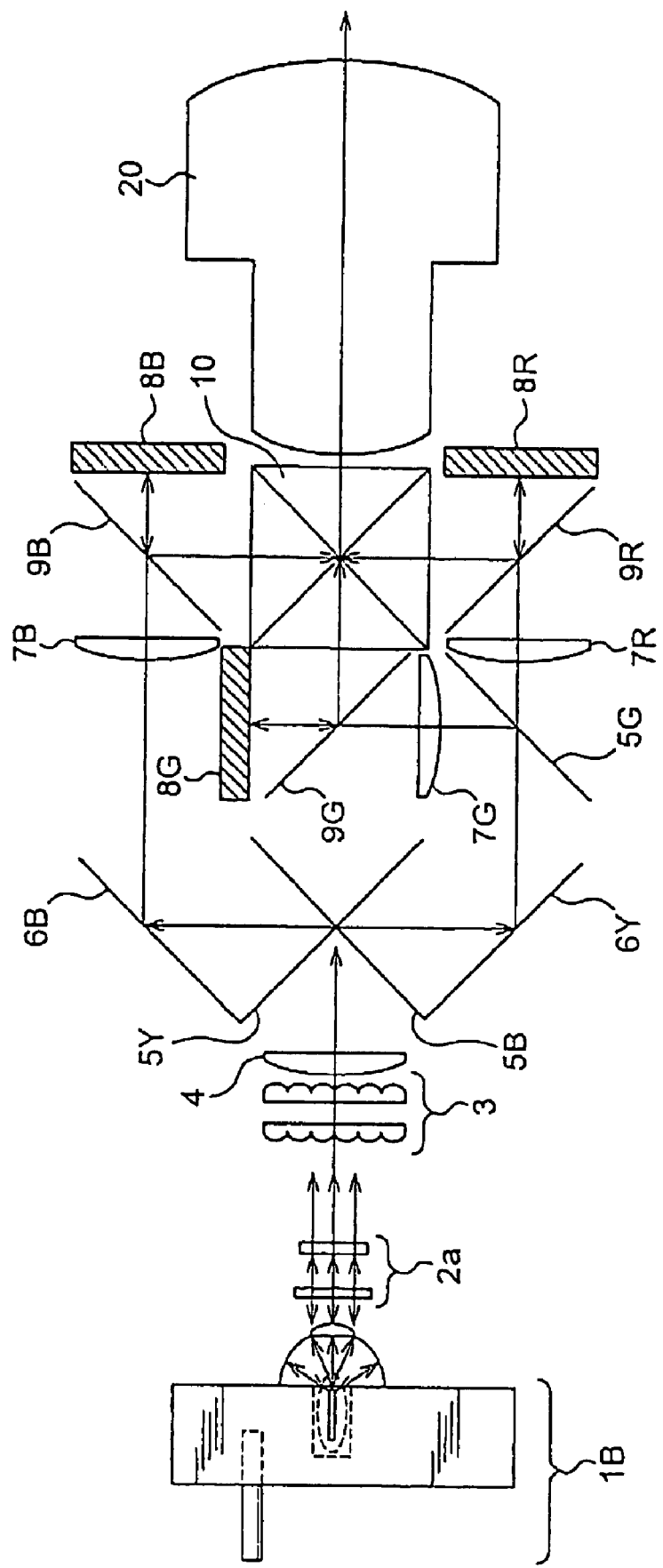

Referring to FIG. 9, a ninth embodiment of the present invention will now be described. In the present embodiment, the light source device 1B according to the second embodiment is reduced into practice as a light source of another image displaying apparatus of the present invention.

FIG. 9 shows the configuration of a projector serving as the above image displaying apparatus. This projector is provided with, in addition to the light source device 1B shown in FIG. 2, a polarizing conversion device 2a composed of a quarter wave plate 27 and a reflective polarizing plate 28, which the device 2a is disposed in the light output path from the light source device 1B. The remaining components other than the light source device 1B and the polarizing conversion device 2a are the same as those shown in FIG. 8.

From the light source device 1B, as explained in the second embodiment (refer to FIG. 2), a collimated flux of light is radiated. This collimated flux of light is made to enter the polarizing conversion device 2a, where a flux of light with a polarized plane which is not allowed to pass the reflective polarizing plate 26 is returned to the light-emitting part 4a of the electrodeless lamp 4 via the quarter waver plate 27 and the convex lens 21 for re-emitting the light. Hence it is possible to provide the image displaying apparatus with a higher coupling efficient, compared to the image displaying apparatus shown in FIG. 8.

As a modification, the light source device 1F with the light source device 1B and the reflective polarizing plate 2a integrated as shown in FIG. 6 can also be applied to the present image displaying apparatus.

Hence, the ninth embodiment also provides the identical advantages to those in the eighth embodiment, thanks to employment of the light source device 1B with a smaller etendue.

Tenth Embodiment

Figure 10:
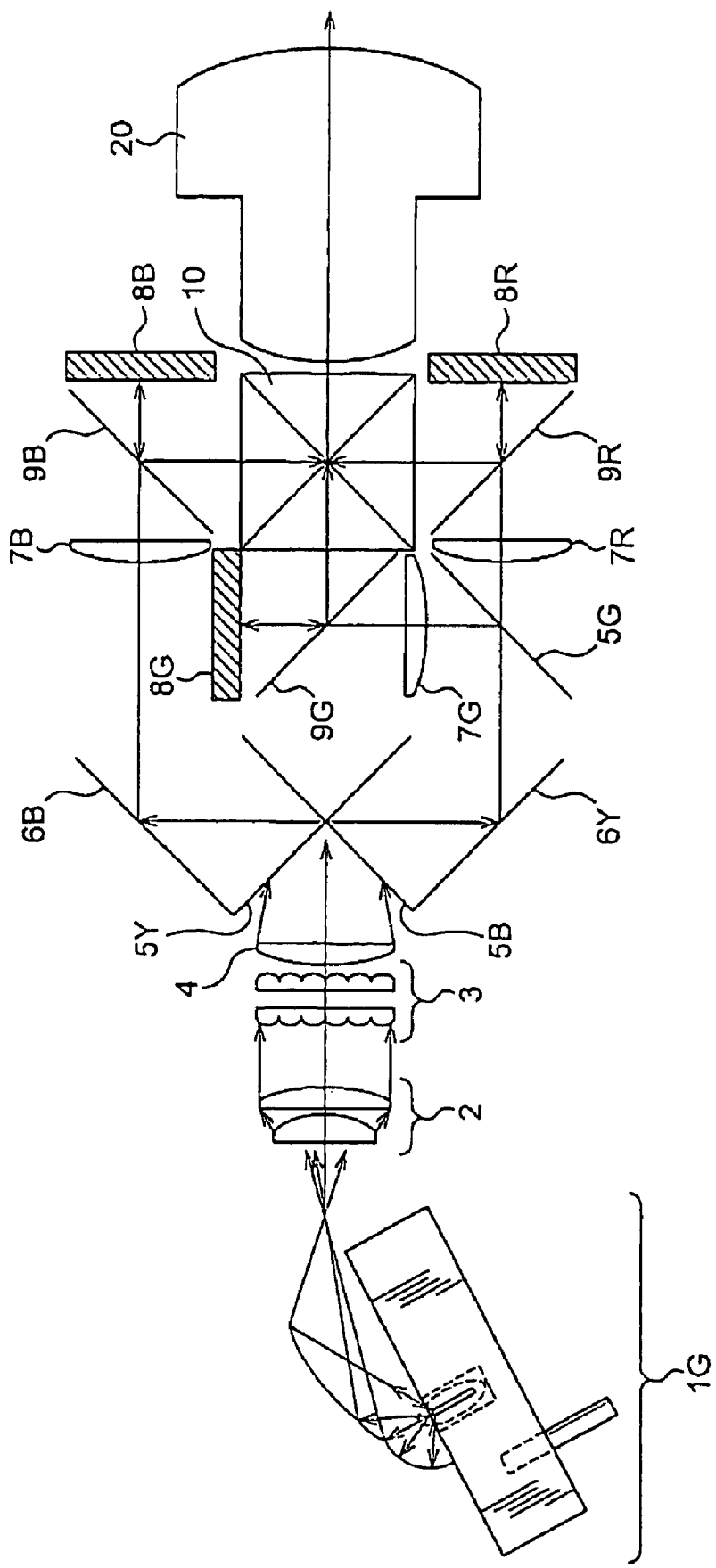

Referring to FIG. 10, a tenth embodiment of the present invention will now be described. In the present embodiment, the light source device 1G according to the seventh embodiment is reduced into practice as a light source of another image displaying apparatus of the present invention.

FIG. 10 shows the configuration of a projector serving as the above image displaying apparatus. This projector is provided with, in addition to the light source device 1G shown in FIG. 7, a light condensing device 2, an integrator 3, and a first field lens 4 in the light output path from the light source device 1G. The remaining components other than the above components are the same as those shown in FIG. 8.

In the light source device 1G, nearly half the flux of light emitted from the light emitting part 4a is reflected to the light emitting part 4a, while the remaining light is made to enter the light condensing device 2 as a converged light. Accordingly, the image displaying apparatus having a coupling efficiency compatible to that of the image displaying apparatus shown in FIG. 8 can be provided.

Hence, the tenth embodiment also provides the identical advantages to those in the eighth embodiment, thanks to employment of the light source device 1G with a smaller etendue.

There can also be provided several other forms of the image displaying apparatus. Although the image displaying apparatuses according to the eighth and tenth embodiments adopt an optical structure in which the radiated light from the light condensing device 2 is directly made to enter the integrator 3 and the image displaying apparatus according to the ninth embodiment adopts an optical structure in which the radiated light from the polarizing conversion device 2a is also directly made to enter the integrator 3, this is not a definitive list. For example, in each optical structure, a polarizing conversion device may additionally be placed before the integrator 3 so that the light is converted into linearly polarized light and then made incidence onto the integrator 3.

Further, the image displaying apparatuses according to the eight to tenth embodiments employ the light source devices described in the first, second and seventh embodiments, respectively. Besides this employment, any one of the light source devices described in the third to sixth embodiments may be employed.

Eleventh Embodiment

Figure 11:
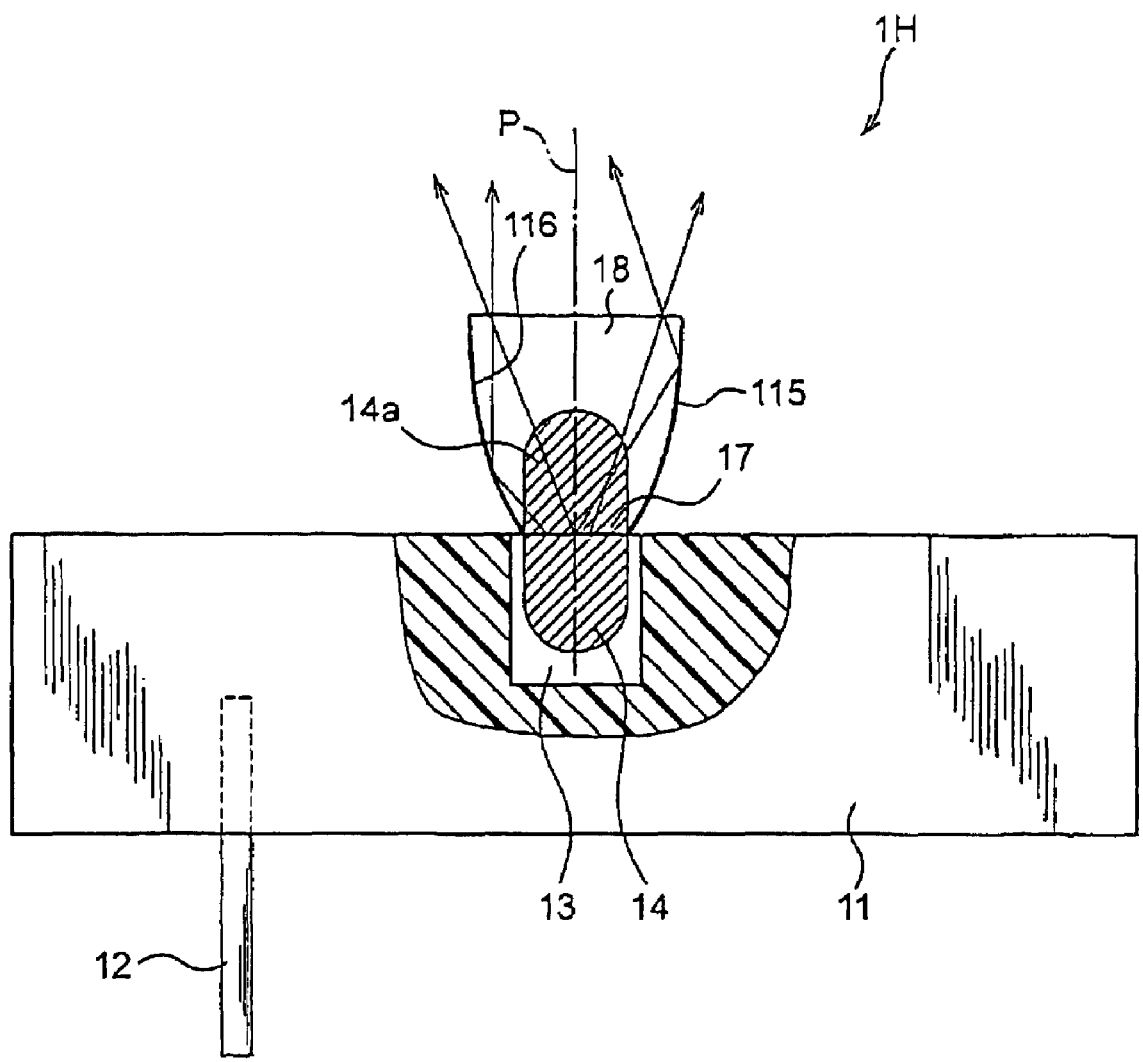
FIG. 11 is a side view, which is partly sectioned, showing the configuration of a light source device according to an eleventh embodiment of the present invention.
Figure 12:
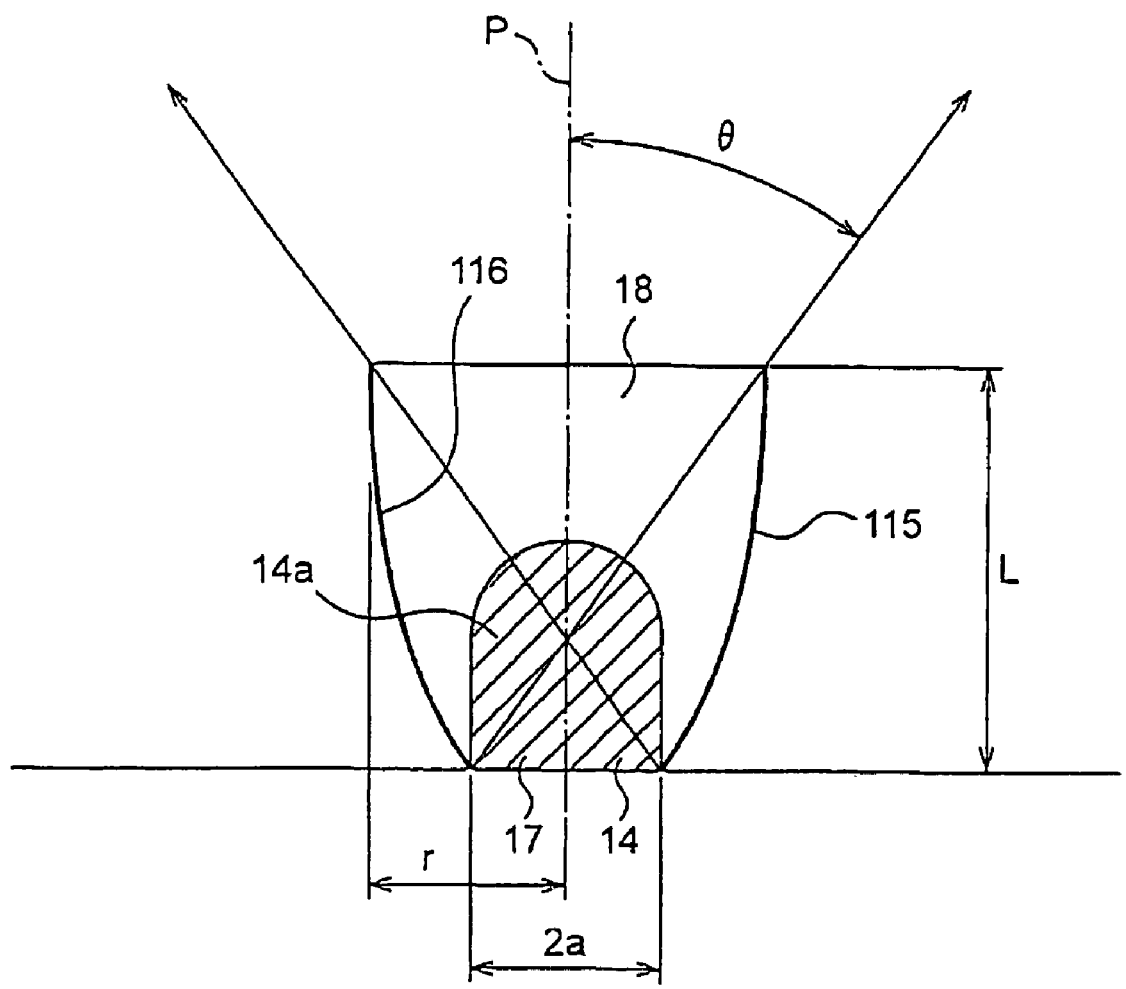
FIG. 12 is a view for illustrating how to decide a radius of a complex paraboloidal light-condensing mirror according to the eleventh embodiment.
Figure 13:
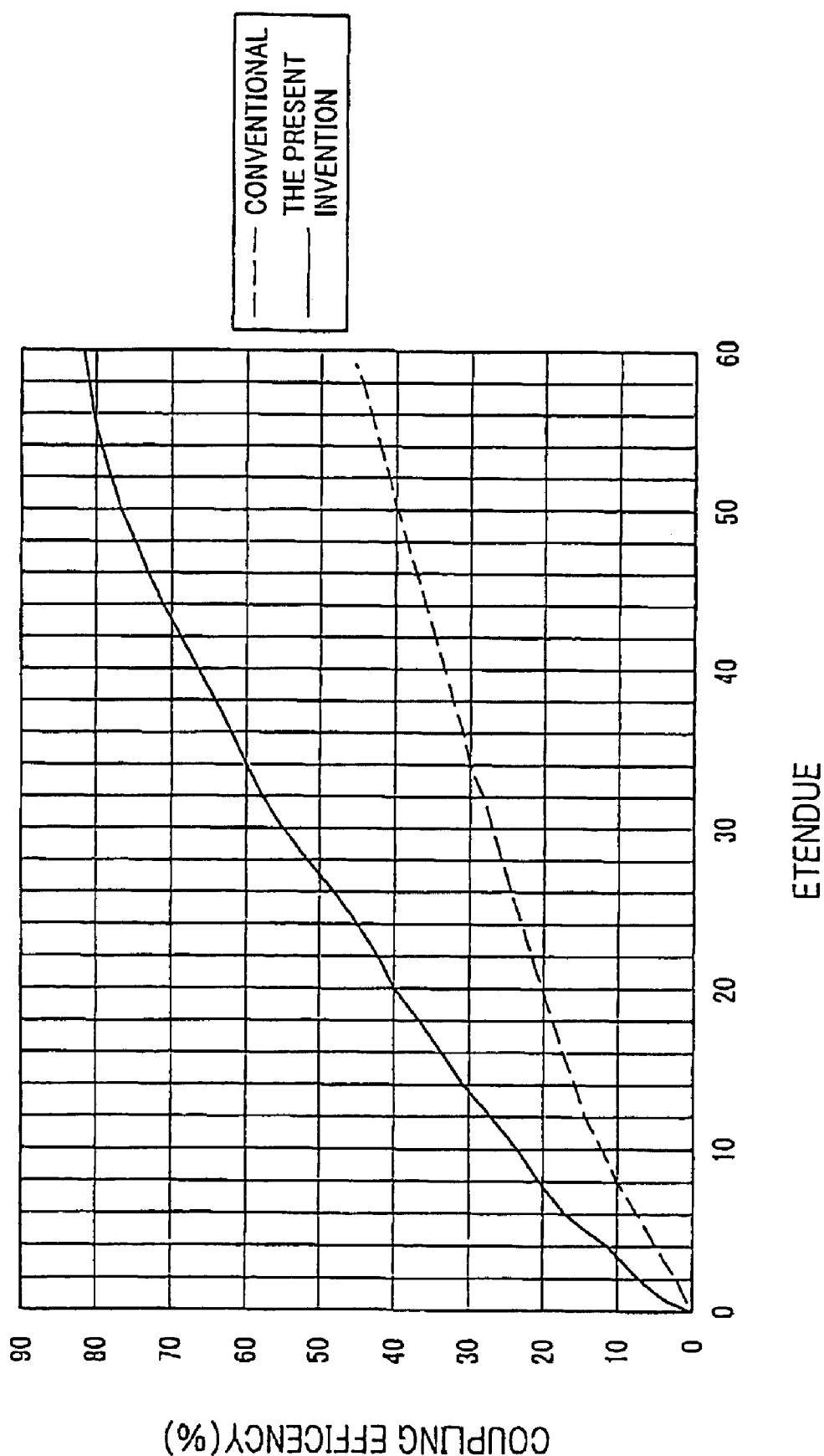
FIG. 13 is a graph showing the relationship the etendue and the coupling efficiency concerning light-condensing optical systems according to the conventional and the present invention.

Referring to FIGS. 11-13, an eleventh embodiment of the present invention will now be described. In the present embodiment, the light source device is reduced into practice in another form.

FIG. 11 shows the structure of a light source device 1H according to the present embodiment. As shown therein, the light source device is provided with a complex paraboloidal light-condensing mirror 115 in addition to the waveguide 11, probe 12, and electrodeless lamp 14 described before.

The complex paraboloidal light-condensing mirror 115 is formed into a cylinder having both ends in the axial directions thereof. The mirror has a reflection surface 116 formed inside the cylindrical wall body. One of both ends serves as a light-source side opening 117, while the other serves as a light-radiating opening 118. This mirror 115 is secured on the surface of the waveguide 11 such that the center of the light-source side opening 117 is positioned at the light-emitting part 14a of the electrodeless lamp 14.

In this structure with the mirror 115, of the flux of light emitted from the light-emitting part 14a, a flux of light that passes a relatively narrow angular range positioned next to the light axis is radiated directly, as it is, through the light-radiating opening 118. In contrast, a flux of light that passes outside the angular range is first reflected by the reflection surface 116 of the complex paraboloidal light-condensing mirror 115, and then radiated from the mirror 15.

The fluxes of light directly radiated through the light-radiating opening 118 and radiated through the light-radiating opening 118 after the reflection on the reflection surface 116 change depending on the same of the complex paraboloidal light-condensing mirror 115. Accordingly, the etendue and coupling efficiency change in the same manner.

Though detailed later, the dimensions as to the radius and axial length of the mirror 115 are decided as below. It is assumed that an approximate center position of the light-emitting part 14a gives an apex and a solid angle is expressed by a conic surface having a center at which a radially-central axis P of the mirror 115 passes. That is, the axis P passes a radial center of each of both openings 117 and 118. Under such assumptions, the radius and the axial length of the mirror 115 are designed such that a flux of light passing an angular range of approx. 0-45 degrees measured from the axis P is directly radiated through the light-radiating opening 118 and a flux of light passing an angular range of approx. 45-90 degrees measured from the axis P is first reflected by the reflection surface 116.

FIG. 12 illustrates how to decide the radius from to be measured from the axis P of the complex paraboloidal light-condensing mirror 115. In FIG. 12, the radius of the light-source side opening 117 of the mirror 115 is given as "a" (i.e., diameter is "2a"), the axial length extending between the openings 117 and 118 is given as L, and an angular range that allows the flux of light emitted from the part 14a to be radiated through the light-radiating opening 118 is represented by a cone of which half angle $\theta$. In such a case, the following formula is realized.

$$L = a(1+\sin\theta)/\tan\theta \cdot \sin\theta \quad (2)$$

For instance, in cases where the radius a=2.5 mm and the angle $\theta$=45 degrees, the axial length L is approximately 6 mm.

Additionally, it is assumed that the positions Z are taken along the axial direction of the mirror 115, the light-source side opening 117 located on the surface of the waveguide 115 provides a reference position (i.e., Z=0), and the radius "r" of the mirror 115, which radius is given until the opening 18, is expressed as a function of the positions Z in the axial direction of the mirror 115. Under such an assumption, the following formula can be realized, which defines the radius r.

$$r\{-(\sin\theta\cdot\cos\theta\cdot Z+a(1+\sin\theta)^2)+\sqrt{((\sin\theta\cdot\cos\theta\cdot Z+a(1+\sin\theta)^2)^2-\cos^2\theta(Z^2\sin^2\theta-2aZ\cos\theta\cdot(2+\sin\theta)-a^2(1+\sin\theta)(3+\sin\theta))}\}/\cos^2\theta \quad (3)$$

Substituting $\theta$=45 degrees into the formulae (2) and (3) respectively leads to the decision of the length L and the radius r. By employing such a technique, the flux of light emitted from the electrodeless lamp 14 can be distributed in such a manner that a flux of light passing the angular range of approx. 0-45 degrees expressed as a half angle of the cone is made to be radiated directly through the light-radiating opening 118. And a flux of light passing an angular range of approx. 45-90 degrees is made to be reflected on the reflection surface 116 of the mirror 115, before being radiated through the light-radiating opening 118.

FIG. 13 shows graphs each showing a relationship between the etendue and the coupling efficiency as to each of the conventional light condensing system already explained by U.S. Pat. No. 6,737,809 and the light condensing system according to the present invention. The graphs show that the coupling efficiency under the same etendue is upgraded as much as approximately twice.

In this way, the light source device according to the present embodiment is able to raise the coupling efficiency largely, compared to the conventional.

Twelfth Embodiment

Figure 14:
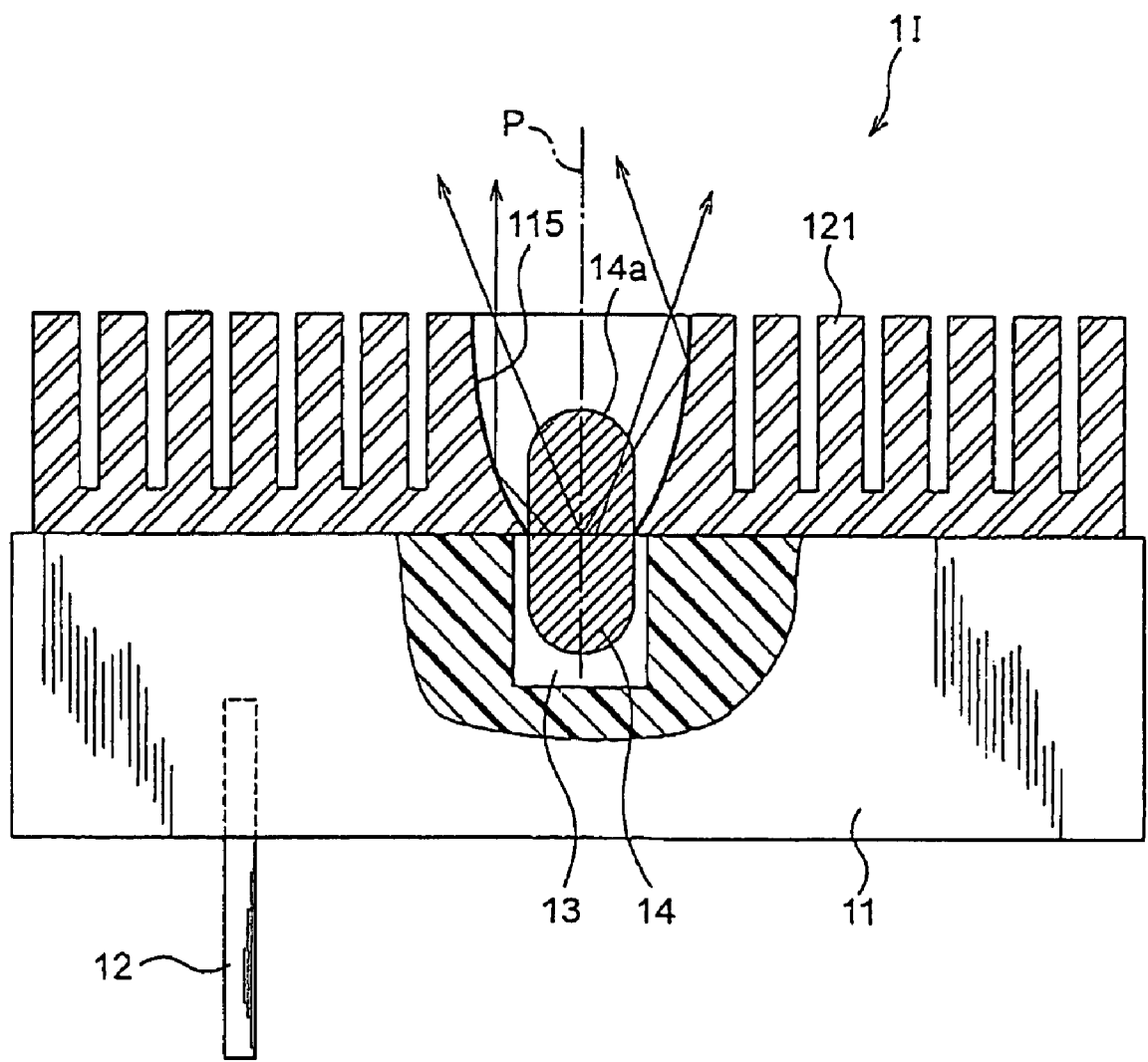
FIG. 14 is a side view, which is partly sectioned, showing the configuration of a light source device according to a twelfth embodiment of the present invention.

Referring to FIG. 14, a twelfth embodiment of the present invention will now be described. In the present embodiment, the light source device is reduced into practice in another form.

A light source device 1I shown in FIG. 14 is characterized in that a heat sink 121 is added to the device 1I whose other structures are the same as that shown in the eleventh embodiment.

It is required that the waveguide 11 is cooled, because the electrodeless lamp 14 generates heat when being activated. In order is to cool down the waveguide 11 (that is, the device 1I), the heat sink 121 is secured to the surface of the waveguide 11. In this case, a further improvement is made such that a paraboloidal through hole for accepting the complex paraboloidal light-condensing mirror 115 is formed through the heat sink 21 itself. The reflection surface 116 of the mirror 115 is formed with metal, whereby the mirror 115 can be cooled down by the heat sink 121 and the heat of the waveguide can be radiated effectively through the heat sink 121 as well. Further, a cooling system for the mirror 115 and a mechanism supporting the mirror 115 become unnecessary, simplifying the whole structure of the light source device 1I.

In this way, the light source device according to the present embodiment can enjoy the advantages of not only largely increasing the coupling efficiency compared to the conventional but also simplifying the structure of the device 1I.

Thirteenth Embodiment

Referring to FIGS. 15 and 16A to 16C a thirteenth embodiment of the present invention will now be described. In the present embodiment, the light source device is reduced into practice in another form.

Figure 15:
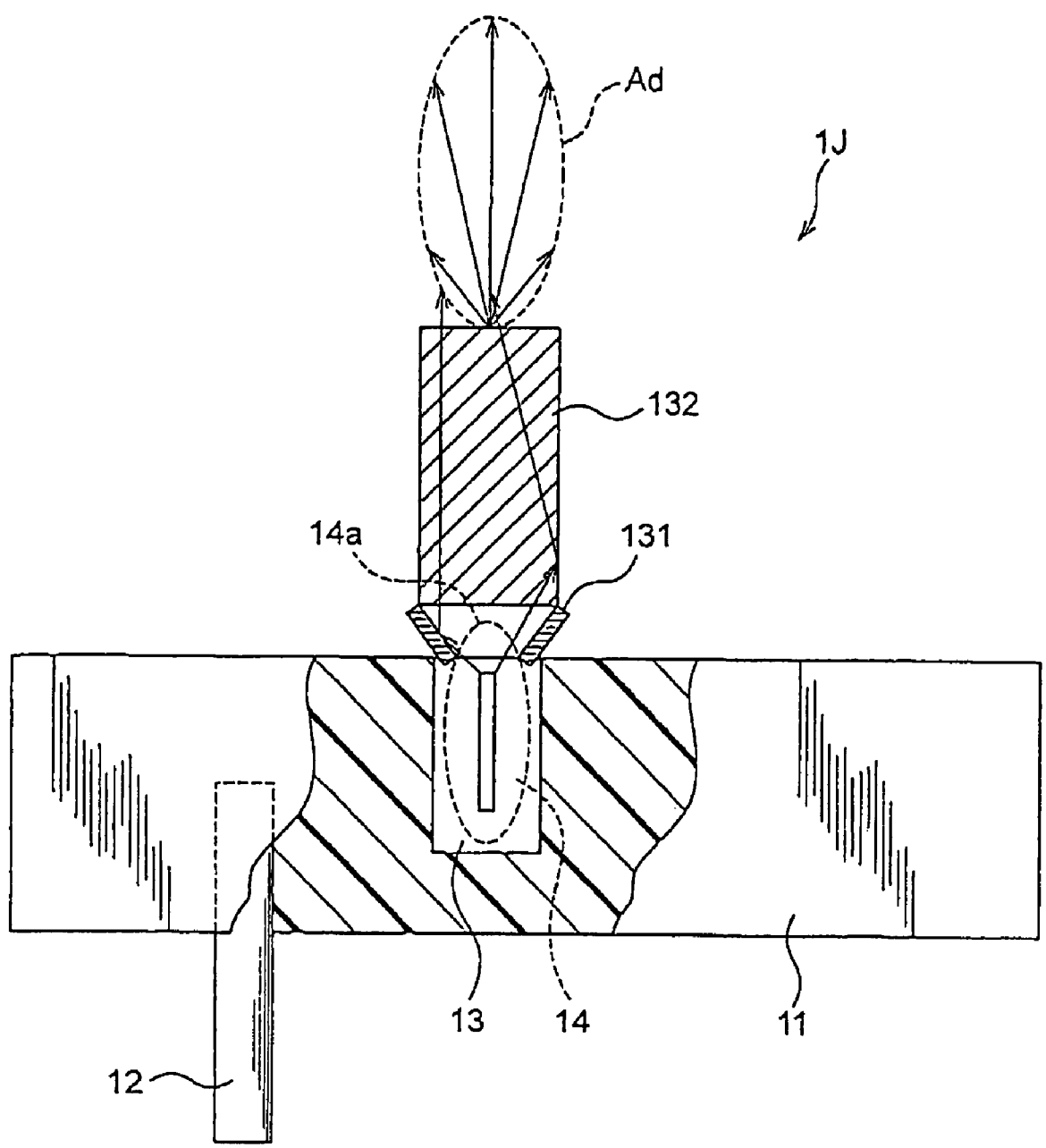
FIG. 15 is a side view, which is accompanied by a light distribution, showing the configuration of a light source device according to a thirteenth embodiment of the present invention.

A light source device 1J shown in FIG. 15 is provided with a reflector 131 and a light pipe 132, instead of using the complex paraboloidal light-condensing mirror 115 used in the FIG. 11 in the eleventh embodiment. The reflector 131 is designed and arranged to reflect a flux of light passing an angular range, which is distant from the light axis, into a direction almost perpendicular to the surface of the waveguide 11. The light pipe 132 is formed to accept both the flux of light reflected from the reflector 131 and a flux of light passing an angular range which is near from the light axis. It is therefore possible that the device 1J has a spatial distribution of light Ad which is longer in the direction of the light axis, compared to the conventional light source device shown in U.S. Pat. No. 6,737,809. Thus the coupling efficiency is increased when the light of flux from the light pipe 132 is made incident into a light-condensing lens system to be optically coupled to the light pipe 132.

Figure 16A:
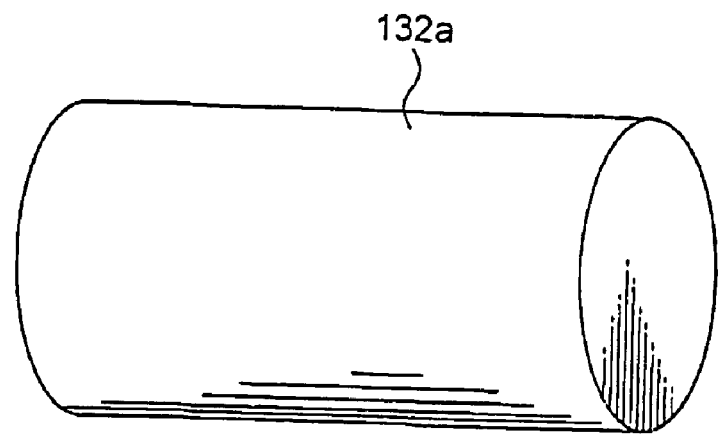
FIGS. 16A-16C show practical outer contours of light pipes used in the thirteenth embodiment.
Figure 16B:
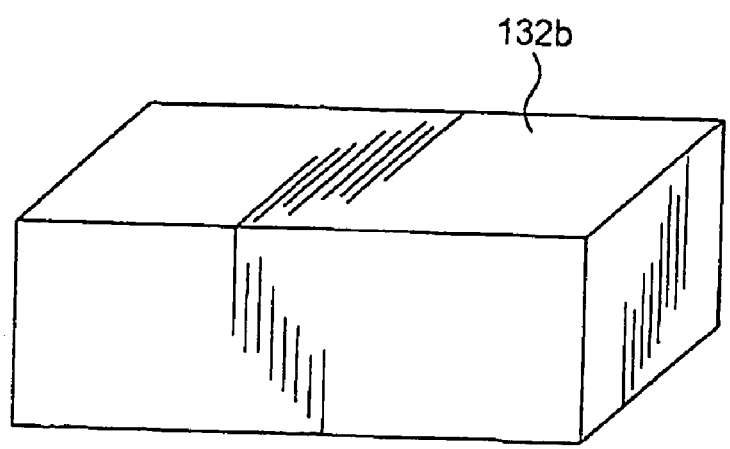
Figure 16C:
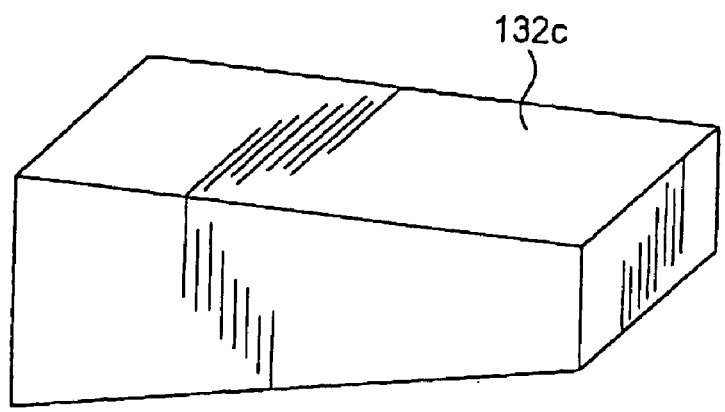

The reflector 131 can be produced as a cone-type divergent reflecting member with a conic inner surface which reflects the light. Meanwhile, by way of example, the light pipe 132 can be selected from a range of variations shown in FIGS. 16A to 16C. FIG. 16A provides a light pipe 132*a* having a circular section, FIG. 16B provides a light pipe 132*b* having a rectangular section, and FIG. 16C provides a light pipe 132*c* having a rectangular section and gradually shortening a width between mutually opposed sides of two of all four paired sides in the length direction thereof.

When the light source device 1J shown in FIG. 15 is applied to, for example, to a projector serving as the image displaying device according to the present invention, the light pipe 132*b* or 132*c* may be used which have a rectangular section that corresponds to an aspect ratio given to a spatial light modulation device.

Therefore, the light source device according to the present embodiment can also increase the coupling efficiency in comparison with that of the conventional device.

Fourteenth Embodiment

Referring to FIG. 17, a fourteenth embodiment of the present invention will now be described. In the present embodiment, the light source device is also reduced into practice in another form.

A light source device 1K shown in FIG. 17 is provided with an ellipsoidal reflecting mirror 141 in place of the complex paraboloidal light-condensing mirror 115 used in the FIG. 11 in the eleventh embodiment. The ellipsoidal reflecting mirror 141 is produced to as to reflect the flux of light emitted from the light emitting part 14*a* of the electrodeless lamp 14 such that the reflected light flux converges outside the device. In addition, this mirror 141 is located on the surface of the waveguide 11 such that the mirror 141 has a focus located at the light emitting part 14*a* of the electrodeless lamp 14.

Incidentally, the ellipsoidal reflecting mirror 141 may be replaced by a paraboloidal reflecting mirror with a paraboloidal surface reflecting the light. This enables the light flux to be radiated and collimated outside the device.

In the light source device according to the present embodiment, all the flux of light emitted by the light-emitting part 14*a* of the electrodeless lamp 14 is radiated to generate a converged light or a collimated light outside the device by using the ellipsoidal reflecting mirror 141 or the paraboloidal reflecting mirror. Hence, compared to the conventional, the coupling efficiency can be enhanced greatly.

The above construction allows the etendue to be decreased by approximately ½ in comparison with the conventional device. It is possible to provide the light source device which has a high coupling efficiency and is preferably directed to optical systems such as small-diameter light pipes.

There are provided modifications concerning the positions of the probe 12 and aperture cavity 13. In the foregoing various embodiments, the probe 12 is linked with the waveguide 11 at the position radially shifted from the radial center of the waveguide 11. However, this is not a decisive positioning way. As long as the electric filed at the aperture cavity 13 of the waveguide 11 becomes its maximum or values regarded as the maximum, the probe 12 may be linked to the waveguide 11 at the radial center or positions regarded as the center of the waveguide 11. The aperture cavity 13 is not always limited to being formed in a central part of the waveguide 11, but being positioned differently from the central part. It is sufficient that the prove 12 can be positioned to generate the electric field which becomes its maximum or thereabouts at the aperture cavity.

The outer shape of the waveguide 11 is not limited to the foregoing cylindrical form, but may be rectangular parallelepiped or other forms.

Fifteenth Embodiment

Figure 18:
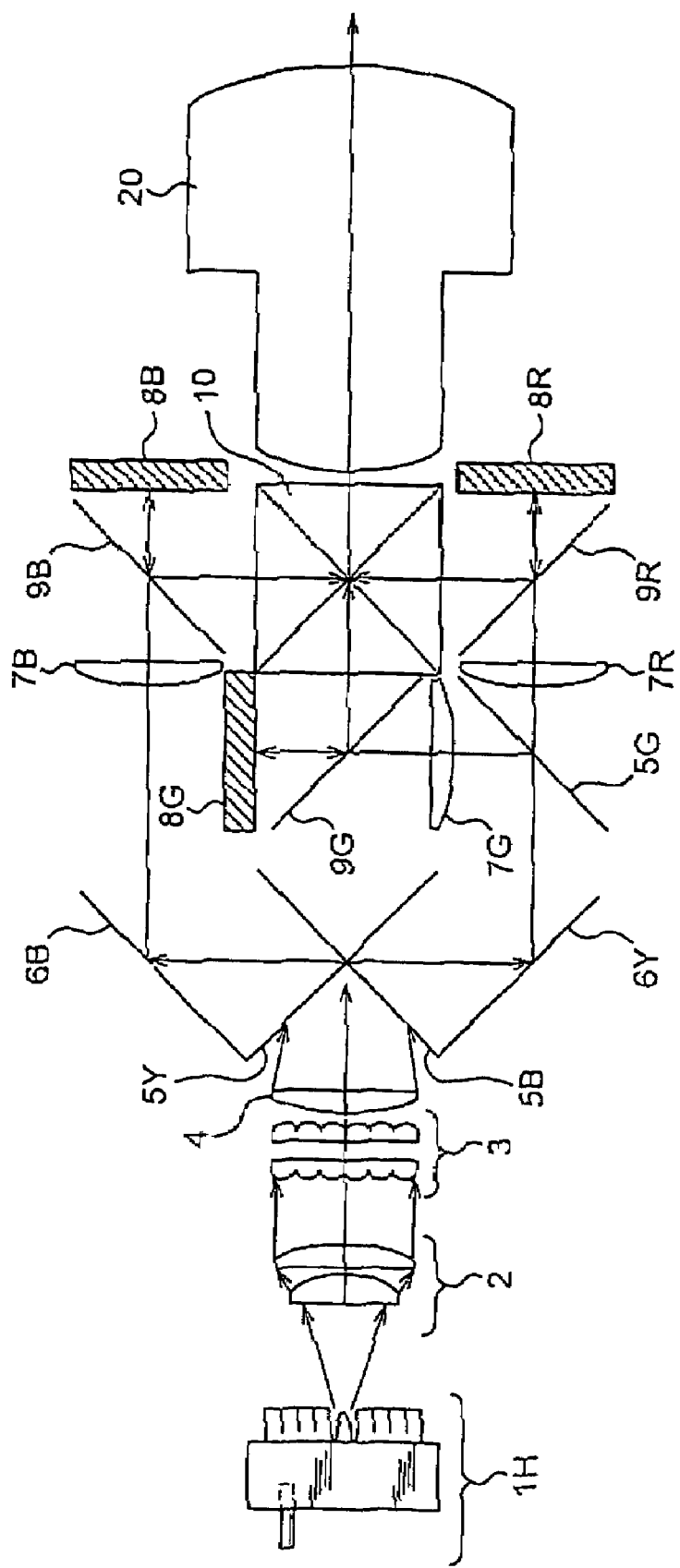
FIGS. 18-20 are outlined schematic diagrams showing image displaying apparatuses according to fifteenth to seventeenth embodiments of the present invention, respectively.

Referring to FIG. 18, a fifteenth embodiment of the present invention will now be described. In the present embodiment, the image displaying device according to the present invention is reduced into practice in another form.

FIG. 18 shows the optical diagram of an image displaying device called projector, in which the light source device 1H shown in the eleventh embodiment (refer to FIG. 11) is adopted as a light source. The components other than the light source device 1H are the same as those already explained.

Since the projector shown in the fifteenth embodiment utilizes the light source device 1H with a higher coupling efficiency, the light condensing system of the projector can be made compact, whereby the projector is compact in size and less in weight. Of course, the other advantages of the projector, which are described before, can be obtained as well.

Sixteenth Embodiment

Figure 19:
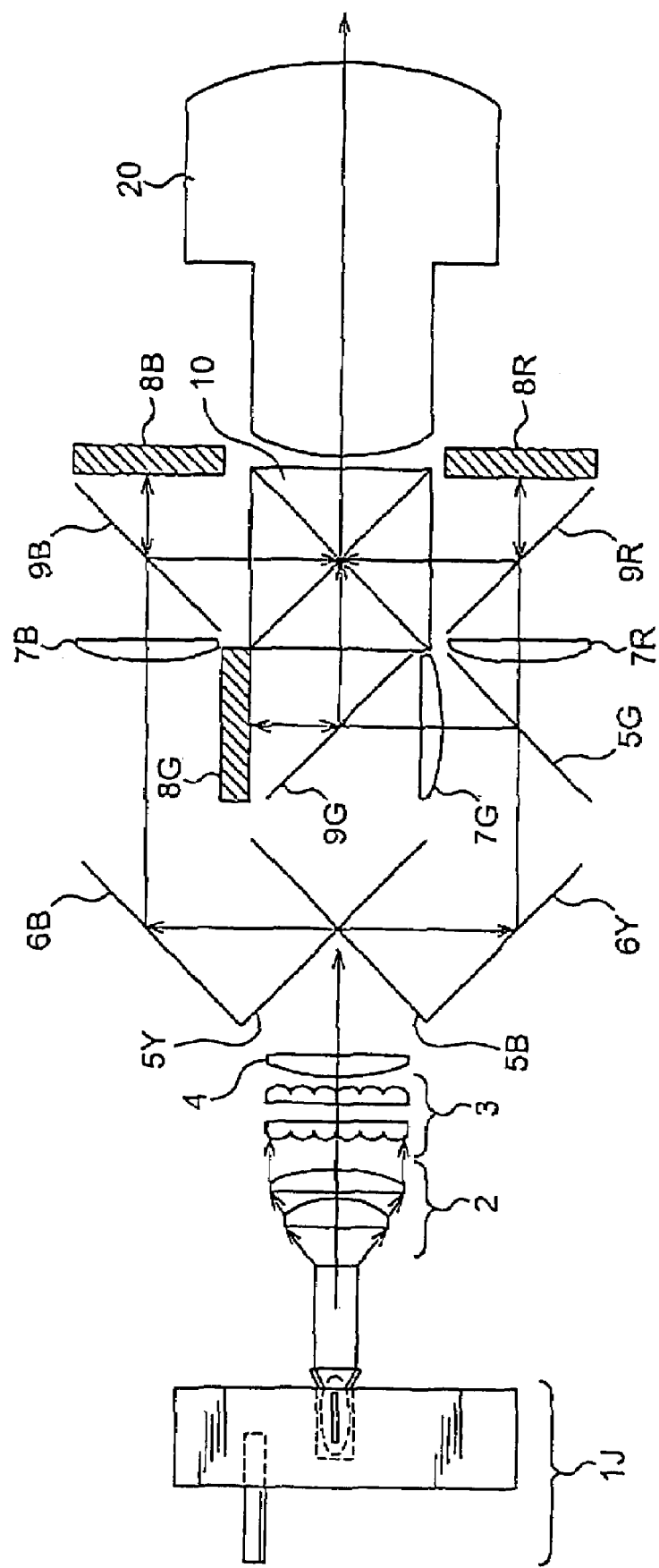

Referring to FIG. 19, a sixteenth embodiment of the present invention will now be described. In the present embodiment, the image displaying device according to the present invention is also reduced into practice in another form.

FIG. 19 shows the optical diagram of a projector, in which the light source device 1J shown in the thirteenth embodiment (refer to FIG. 15) is adopted as a light source. The components other than the light source device 1J are the same as those already explained.

In the projector according to the present embodiment, there is provided the light source device 1J whose coupling efficiency is higher, whereby the light condensing system of the projector can be made compact. Hence the projector is compact in size and less in weight. Additionally, the reflective liquid crystal display panels are used as the spatial light modulation devices 8R, 8G and 8B, so that it is possible to provide an illumining system appropriate for a lower-etendue optical system on polarizing conversion. Hence a projector with a higher brightness, higher contrast, and longer operation life is provided as the image displaying apparatus.

Seventeenth Embodiment

Figure 20:
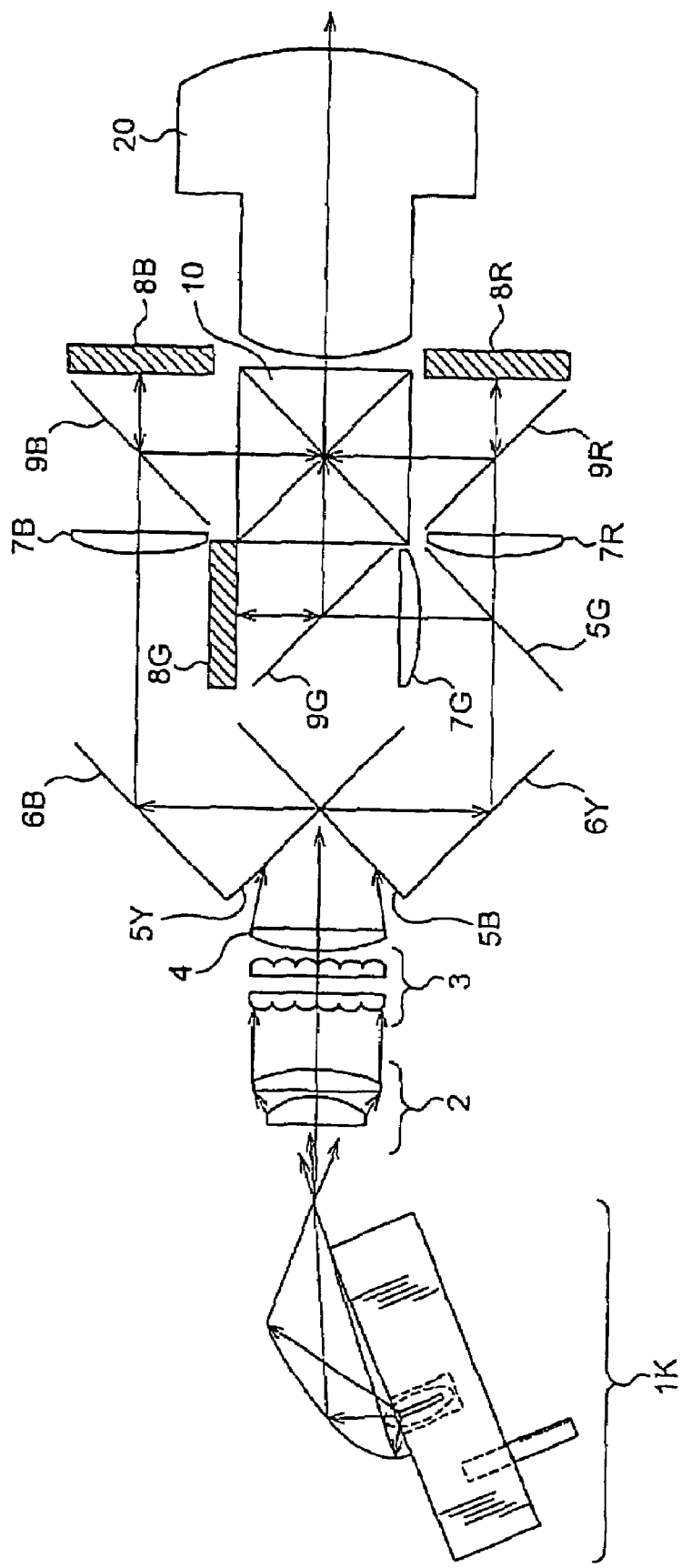

Referring to FIG. 20, a seventeenth embodiment of the present invention will now be described. In the present embodiment, the image displaying device according to the present invention is also reduced into practice in another form.

FIG. 20 shows the optical diagram of a projector, in which the light source device 1K shown in the fourteenth embodiment (refer to FIG. 17) is adopted as a light source. The components other than the light source device 1K are the same as those already explained.

In the projector according to the present embodiment, there is provided the light source device 1K whose coupling efficiency is higher, whereby the light condensing system of the projector can be made compact. Therefore, the operations and advantages similar or identical to those in the foregoing the sixteenth embodiment can be obtained in the present projector.

Incidentally, in the projectors according to the fifteenth to seventeenth embodiments, the light coming from the light condensing device 2 is directly made incident into the integrator 3. However another form is possible such that a quarter wave plate and a reflective polarizing plate are positioned before the integrator to covert the light Into linearly polarized light entering the integrator 3.

Further, the projectors according to the fifteenth to seventeenth embodiments may adopt the light source device 1I according to the twelfth embodiment, instead of adopting the light source devices explained in the eleventh, thirteenth, and fourteenth embodiments. Such replacements can also provide the similar advantages to the foregoing ones.

The present invention may be embodied in several other forms without departing from the spirit thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A light source device comprising:
   a waveguide formed to contain a medium enabling a microwave to resonate and formed to have a surface and an aperture cavity with an aperture opened at a predetermined position of the surface;
   an electrodeless lamp loaded in the aperture cavity in a state where part of the electrodeless lamp is protruded from the surface of the waveguide so that the part of the electrode lamp emits light in response to applying the microwave to the electrodeless lamp;
   a probe supplying a high-freciuency signal to the waveguide so that the high-freciuency signal is converted to the microwave in the waveguide; and
   converging means disposed on the surface of the waveguide to face the aperture cavity and formed to utilize, without leakage of light, the light emitted from the part of the electrodeless lamp so as to converge the light, wherein the converging means comprises a spherical reflecting mirror formed into a quaquaversal shape having a top, disposed on the surface of the waveguide to enclose the aperture cavity, and formed to have a semi-spherical reflecting surface to be opposed to the aperture cavity and an aperture formed at the top of the mirror, the reflecting surface providing a focus located at the part of the electrodeless lamp and the aperture of the mirror allowing the light emitted from the part of the electrodeless lamp to pass therethrough.

2. The light source device according to claim 1, further comprising a convex lens loaded to the spherical reflecting mirror to cover the aperture of the spherical reflecting mirror.

3. A light source device comprising:
   a waveguide formed to contain a medium enabling a microwave to resonate and formed to have a surface and an aperture cavity with an aperture opened at a predetermined position of the surface;
   an electrodeless lamp loaded in the aperture cavity in a state where part of the electrodeless lamp is protruded from the surface of the waveguide so that the part of the electrode lamp emits light in response to applying the microwave to the electrodeless lamp;
   a probe supplying a high-frequency signal to the waveguide so that the high-frequency signal is converted to the microwave in the waveguide; and
   converging means disposed on the surface of the waveguide to face the aperture cavity and formed to utilize, without leakage of light, the light emitted from the part of the electrodeless lamp so as to converge the light,
   wherein the converging means comprises a reflecting mirror attached to the surface of the waveguide to enclose the aperture cavity and formed to have a first reflecting mirror part and a second reflecting mirror part which are located to receive fluxes of light, respectively, through two emitting regions approximately equally dividing a whole emitting region of the light emitted from the part of the electrodeless lamp, wherein
   the first reflecting mirror part is a spherical reflecting mirror part partially receiving the flux of light through one of the two emitting regions and providing a focus located at the part of the electrodeless lamp so that the received light is reflected to the part of the electrodeless lamp, and
   the second reflecting mirror part is either an ellipsoidal reflecting mirror part or a paraboloidal reflecting mirror part partially receiving the flux of light through the other of the two emitting regions and reflecting the received light toward an outside of the waveguide to allow the reflected light to be converged in the outside.

4. A light source device comprising:
   a waveguide formed to contain a medium enabling a microwave to resonate and formed to have a surface and an aperture cavity with an aperture opened at a predetermined position of the surface;
   an electrodeless lamp loaded in the aperture cavity in a state where part of the electrodeless lamp is protruded from the surface of the waveguide so that the part of the electrode lamp emits light in response to applying the microwave to the electrodeless lamp;
   a probe supplying a high-freciuency signal to the waveguide so that the high-frequency signal is converted to the microwave in the waveguide; and
   converging means disposed on the surface of the waveguide to face the aperture cavity and formed to utilize, without leakage of light, the light emitted from the part of the electrodeless lamp so as to converge the light, wherein the converging means comprises a complex paraboloidal light-condensing mirror disposed to the surface of the waveguide to face the aperture cavity so as to converge the light emitted from the part of the electrodeless lamp.

5. The light source device according to claim 4, wherein complex paraboloidal light-condensing mirror is formed into a cylindrical form having an axial direction, has a first opening located to enclose the aperture cavity such that the part of the electrodeless lamp is located at a center of the first opening and a second opening opposed to the first opening in the axial direction,
   wherein, dimensions of the cylindrical form of the complex paraboloidal light-condensing mirror are decided such that, of the flux of light from the part of the electrodeless lamp, a flux of light passing an angular range of approximately 0-45 degrees from an axis is radiated from the second opening without reflection on the mirror and a flux of light passing an angular range of approximately 45-90 degrees from the axis is reflected by the complex paraboloidal light-condensing mirror, the axis being in parallel to the axial direction and passing a radial center of each of the first and second openings and the angular ranges being expressed by a solid angle from the axis.

6. A light source device comprising:
   a waveguide formed to contain a medium enabling a microwave to resonate and formed to have a surface and an aperture cavity with an aperture opened at a predetermined position of the surface;

an electrodeless lamp loaded in the aperture cavity in a state where part of the electrodeless lamp is protruded from the surface of the waveguide so that the part of the electrode lamp emits light in response to applying the microwave to the electrodeless lamp;

a probe supplying a high-freciuency signal to the waveguide so that the high-freciuency signal is converted to the microwave in the waveguide; and converging means disposed on the surface of the waveguide to face the aperture cavity and formed to utilize, without leakage of light, the light emitted from the part of the electrodeless lamp so as to converge the light, wherein the converging means comprises a reflecting member reflecting, of the flux of light emitted from the part of the electrodeless lamp, a flux of light passing a preset angular range starting from the surface of the waveguide into a direction approximately perpendicular to the surface of the waveguide and a light pipe allowing, of the flux of light emitted from the part of the electrodeless lamp, not only a flux of light passing an angular region other than the present angular range but also the flux of light reflected by the reflecting member to be incident thereinto without reflection.

7. A light source device comprising:

a waveguide formed to contain a medium enabling a microwave to resonate and formed to have a surface and an aperture cavity with an aperture opened at a predetermined position of the surface;

an electrodeless lamp loaded in the aperture cavity in a state where part of the electrodeless lamp is protruded from the surface of the wave guide so that the part of the electrode lamp emits light in response to applying the microwave to the electrodeless lamp;

a probe supplying a high-freciuency signal to the waveguide so that the high-frequency signal is converted to the microwave in the waveguide; and converging means disposed on the surface of the waveguide to face the aperture cavity and formed to utilize, without leakage of light, the light emitted from the part of the electrodeless lamp so as to converge the light, wherein the converging means comprises a paraboloidal reflecting mirror disposed on the surface of the waveguide and formed to reflect the flux of light emitted from the part of the electrodeless lamp so as to produce a flux of converged light in an outside of the waveguide.

8. A light source device comprising:

a waveguide formed to contain a medium enabling a microwave to resonate and formed to have a surface and an aperture cavity with an aperture opened at a predetermined position of the surface;

an electrodeless lamp loaded in the aperture cavity in a state where part of the electrodeless lamp is protruded from the surface of the waveguide so that the part of the electrode lamp emits light in response to applying the microwave to the electrodeless lamp;

a probe supplying a high-frequency signal to the waveguide so that the high-freciuency signal is converted to the microwave in the waveguide; and converging means disposed on the surface of the waveguide to face the aperture cavity and formed to utilize, without leakage of light, the light emitted from the part of the electrodeless lamp so as to converge the light, wherein the converging means comprises an ellipsoidal reflecting mirror disposed on the surface of the waveguide and formed to reflect the flux of light emitted from the part of the electrodeless lamp so as to produce a flux of converged light in an outside of the waveguide.

9. An image displaying apparatus comprising a light source device comprising:

a waveguide formed to contain a medium enabling a microwave to resonate and formed to have a surface and an aperture cavity with an aperture opened at a predetermined position of the surface;

an electrodeless lamp loaded in the aperture cavity in a state where part of the electrodeless lamp is protruded from the surface of the waveguide so that the part of the electrode lamp emits light in response to applying the microwave to the electrodeless lamp;

a probe supplying a high-frequency signal to the waveguide so that the high- frequency signal is converted to the microwave in the waveguide; and converging means disposed on the surface of the waveguide to face the aperture cavity and formed to utilize all the light emitted from the part of the electrodeless lamp so as to converge the light;

a separator separating the light emitted from the light source device into fluxes of light of three primary colors consisting of red, green and blue;

a modulator modulating each of the separated fluxes of light of the three primary colors depending on image signals; and a dichroic prism optically combining the modulated fluxes of light to emit the combined fluxes of light as image light.

* * * * *